(12) United States Patent
Bergen

(10) Patent No.: US 12,345,804 B2
(45) Date of Patent: Jul. 1, 2025

(54) SYSTEMS AND METHODS FOR ADJUSTING VEHICLE LANE POSITION

(71) Applicant: Deere & Company, Moline, IL (US)

(72) Inventor: Scott Bergen, New Canaan, CT (US)

(73) Assignee: Deere & Company, Moline, IL (US)

( * ) Notice: Subject to any disclaimer, the term of this patent is extended or adjusted under 35 U.S.C. 154(b) by 271 days.

(21) Appl. No.: 17/831,268

(22) Filed: Jun. 2, 2022

(65) Prior Publication Data

US 2023/0093282 A1 Mar. 23, 2023

Related U.S. Application Data

(63) Continuation-in-part of application No. 17/479,621, filed on Sep. 20, 2021, now abandoned.

(51) Int. Cl.
*G01S 13/75* (2006.01)
*B60W 30/12* (2020.01)
*G01S 13/931* (2020.01)

(52) U.S. Cl.
CPC .......... *G01S 13/751* (2013.01); *B60W 30/12* (2013.01); *G01S 13/931* (2013.01); *B60W 2420/408* (2024.01); *B60W 2552/05* (2020.02); *B60W 2552/53* (2020.02); *B60W 2555/60* (2020.02); *G01S 2013/9329* (2020.01)

(58) Field of Classification Search
CPC .................. G01S 13/751; G01S 13/931; G01S 2013/9329; B60W 30/12; B60W 2552/53; B60W 2555/60; B60W 2552/05; B60W 2420/408
USPC ........................................................... 701/26
See application file for complete search history.

(56) References Cited

U.S. PATENT DOCUMENTS

| 4,027,840 A | 6/1977 | Blair |
| 5,483,241 A | 1/1996 | Waineo et al. |
| 5,917,430 A * | 6/1999 | Greneker, III ... G08G 1/096716 340/936 |

(Continued)

FOREIGN PATENT DOCUMENTS

WO WO-2013141923 A2 * 9/2013 ............. G01S 13/75

OTHER PUBLICATIONS

International Search Report and Written Opinion received for International Patent Application No. PCT/US22/44155, mailed on Apr. 13, 2023, 10 pages.

(Continued)

*Primary Examiner* — Nuzhat Pervin
(74) *Attorney, Agent, or Firm* — Gary L. Montle; Lucian Wayne Beavers; Patterson Intellectual Property Law, PC

(57) ABSTRACT

The present disclosure includes systems and methods for adjusting the lane position of a vehicle. A radar system positioned on a first vehicle is configured to transmit radio waves and receive reflections of the radio waves, which produces radar data indicative of the reflections. At least one controller of the first vehicle is configured to identify at least one radar marker based on the radar data and to determine the location of the identified marker. The at least one controller is further configured to decode encoded information of the radar marker, where the information may indicate a condition associated with the roadway on which the vehicle is traveling. The at least one controller may then adjust the lane position of the vehicle based on the location of the marker and any decoded information.

18 Claims, 19 Drawing Sheets

(56) References Cited

U.S. PATENT DOCUMENTS

| | | | | |
|---|---|---|---|---|
| 7,295,925 B2* | 11/2007 | Breed | G08G 1/096783 340/436 |
| 7,426,437 B2* | 9/2008 | Breed | G05D 1/0274 340/995.12 |
| 7,558,674 B1* | 7/2009 | Neilley | G01W 1/02 702/3 |
| 7,610,146 B2* | 10/2009 | Breed | G01C 21/28 701/300 |
| 7,647,180 B2* | 1/2010 | Breed | G08G 1/161 340/436 |
| 7,840,342 B1* | 11/2010 | Breed | G08G 1/161 340/436 |
| 7,912,645 B2* | 3/2011 | Breed | G01C 21/28 701/408 |
| 7,983,802 B2* | 7/2011 | Breed | G08G 1/161 701/1 |
| 8,000,897 B2* | 8/2011 | Breed | G05D 1/0274 701/532 |
| 8,160,758 B2 | 4/2012 | Call et al. | |
| 8,630,795 B2* | 1/2014 | Breed | G01C 21/3697 701/1 |
| 8,892,271 B2* | 11/2014 | Breed | G08G 1/161 701/2 |
| 8,965,677 B2* | 2/2015 | Breed | G08G 1/163 701/301 |
| 9,080,866 B1* | 7/2015 | Dowdall | G01S 17/42 |
| 9,103,671 B1* | 8/2015 | Breed | G01S 13/865 |
| 9,261,881 B1* | 2/2016 | Ferguson | B60W 10/04 |
| 9,440,652 B1* | 9/2016 | Ferguson | B60W 10/04 |
| 9,688,272 B2* | 6/2017 | Shiraishi | B60W 30/14 |
| 10,127,462 B1* | 11/2018 | Pratt | G06V 20/588 |
| 10,317,519 B2* | 6/2019 | Rohani | G01S 13/89 |
| 10,317,524 B2* | 6/2019 | Rohani | G01S 13/931 |
| 10,404,261 B1 | 9/2019 | Josefsberg et al. | |
| 10,571,280 B2* | 2/2020 | Pratt | G01S 7/412 |
| 10,612,199 B2* | 4/2020 | Pratt | G01S 7/412 |
| 10,723,281 B1* | 7/2020 | Briggs | B60R 11/04 |
| 11,105,905 B2* | 8/2021 | Briggs | H04N 23/90 |
| 11,199,413 B2* | 12/2021 | Weissman | G01S 17/06 |
| 11,293,758 B2* | 4/2022 | Hamilton | G08G 1/017 |
| 11,333,762 B2* | 5/2022 | Di Cicco | G01S 17/89 |
| 11,334,089 B1* | 5/2022 | Bryce | G02B 5/136 |
| 11,979,792 B2* | 5/2024 | Matsumoto | G01C 21/3815 |
| 2005/0187701 A1* | 8/2005 | Baney | G08G 1/096716 340/907 |
| 2007/0109111 A1* | 5/2007 | Breed | G01C 21/3697 340/435 |
| 2007/0152804 A1* | 7/2007 | Breed | G08G 1/096783 701/301 |
| 2008/0015771 A1* | 1/2008 | Breed | G01S 19/17 340/461 |
| 2008/0040023 A1* | 2/2008 | Breed | G05D 1/0278 701/472 |
| 2008/0040029 A1* | 2/2008 | Breed | G08G 1/161 701/514 |
| 2008/0042815 A1* | 2/2008 | Breed | G05D 1/0246 340/435 |
| 2008/0133136 A1* | 6/2008 | Breed | G05D 1/0246 340/901 |
| 2008/0147253 A1* | 6/2008 | Breed | G01C 21/3697 701/3 |
| 2008/0150786 A1* | 6/2008 | Breed | B60W 30/04 342/53 |
| 2008/0161986 A1* | 7/2008 | Breed | G01S 19/51 701/23 |
| 2008/0161987 A1* | 7/2008 | Breed | G08G 1/161 701/27 |
| 2008/0162036 A1* | 7/2008 | Breed | G08G 1/161 701/408 |
| 2008/0165018 A1* | 7/2008 | Breed | G08G 1/161 340/463 |
| 2008/0167819 A1* | 7/2008 | Breed | G08G 1/161 701/300 |
| 2008/0167821 A1* | 7/2008 | Breed | G08G 1/161 701/301 |
| 2008/0215231 A1* | 9/2008 | Breed | G08G 1/161 382/104 |
| 2009/0030605 A1* | 1/2009 | Breed | B60W 30/18154 340/901 |
| 2009/0033540 A1* | 2/2009 | Breed | G05D 1/0278 701/472 |
| 2009/0140887 A1* | 6/2009 | Breed | G01C 21/1656 701/116 |
| 2010/0280751 A1* | 11/2010 | Breed | G08G 1/161 701/414 |
| 2011/0291874 A1* | 12/2011 | De Mersseman | G01S 13/87 342/70 |
| 2012/0264376 A1* | 10/2012 | Breed | G08G 1/161 455/66.1 |
| 2012/0323474 A1* | 12/2012 | Breed | G08G 1/161 701/117 |
| 2013/0238192 A1* | 9/2013 | Breu | B62D 15/029 701/41 |
| 2014/0104051 A1* | 4/2014 | Breed | G06V 20/56 340/435 |
| 2014/0368378 A1* | 12/2014 | Crain | G01S 13/867 342/25 A |
| 2015/0025788 A1* | 1/2015 | Crain | H01Q 1/007 342/25 A |
| 2015/0175161 A1* | 6/2015 | Breed | B60W 30/08 348/148 |
| 2016/0231746 A1* | 8/2016 | Hazelton | G05D 1/0274 |
| 2017/0183035 A1* | 6/2017 | Patana | B60W 30/12 |
| 2017/0307733 A1* | 10/2017 | Stainvas Olshansky | G01S 13/87 |
| 2018/0244292 A1* | 8/2018 | Bailey | B61L 23/06 |
| 2018/0277019 A1* | 9/2018 | Wrobel | G08G 1/09626 |
| 2018/0329033 A1* | 11/2018 | Pratt | E01F 9/30 |
| 2018/0330174 A1* | 11/2018 | Pratt | G01S 7/411 |
| 2019/0056491 A1* | 2/2019 | Bialer | G01S 13/931 |
| 2019/0072666 A1* | 3/2019 | Duque Biarge | G01S 13/9023 |
| 2019/0072668 A1* | 3/2019 | Duque Biarge | G01S 13/505 |
| 2019/0080612 A1* | 3/2019 | Weissman | G01S 13/758 |
| 2019/0088148 A1* | 3/2019 | Jacobus | H04L 67/125 |
| 2019/0092360 A1* | 3/2019 | Green | B61L 25/021 |
| 2019/0250269 A1* | 8/2019 | Miu | G05D 1/021 |
| 2019/0310380 A1* | 10/2019 | Berton | G06V 20/182 |
| 2020/0132802 A1* | 4/2020 | Wohlte | G01S 13/931 |
| 2020/0150224 A1* | 5/2020 | Cejka | G01S 13/931 |
| 2020/0166636 A1* | 5/2020 | Mihajlovic | G05D 1/0257 |
| 2020/0258392 A1* | 8/2020 | Weissman | G01S 13/876 |
| 2020/0284883 A1* | 9/2020 | Ferreira | G01S 7/4815 |
| 2020/0370890 A1* | 11/2020 | Hamilton | G08G 1/04 |
| 2021/0213930 A1* | 7/2021 | Sengupta | B60R 11/04 |
| 2021/0389452 A1* | 12/2021 | Lau | G01S 13/347 |
| 2021/0396871 A1* | 12/2021 | Miu | B60W 50/14 |
| 2022/0107405 A1* | 4/2022 | Mordechai | G01S 13/584 |
| 2022/0137210 A1* | 5/2022 | Campbell | G01S 13/86 342/70 |
| 2022/0276375 A1* | 9/2022 | Armstrong-Crews | G01S 7/292 |
| 2022/0334247 A1* | 10/2022 | Chen | G01S 13/582 |
| 2024/0004029 A1* | 1/2024 | Duncklee | G01S 7/003 |

OTHER PUBLICATIONS

International Search Report and Written Opinion received for International Patent Application No. PCT/US22/44135, mailed on Feb. 22, 2023, 07 pages.

"Enhanced RADAR Positioning," Wikipedia, Jan. 13, 2019, https://en.wikipedia.org/wiki/Enhanced_RADAR_positioning.

Abatzoglou, et al., U.S. Appl. No. 17/375,994, entitled, "Methods and Systems for Processing Radar Signals," filed Jul. 14, 2021.

Bergen, U.S. Appl. No. 17/479,629, entitled, "Systems and Methods for Communicating with Vehicles Using Radar," filed Sep. 20, 2021.

(56) References Cited

OTHER PUBLICATIONS

International Search Report for PCT/US2022/044135 dated Feb. 22, 2023.

* cited by examiner

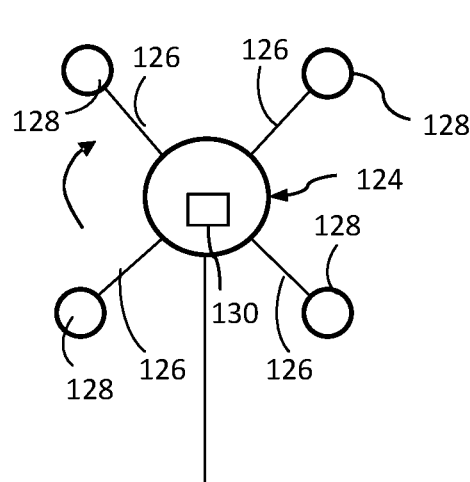
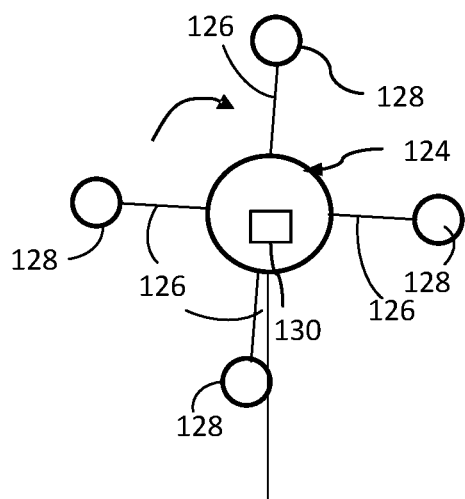
FIG. 8A  FIG. 8B
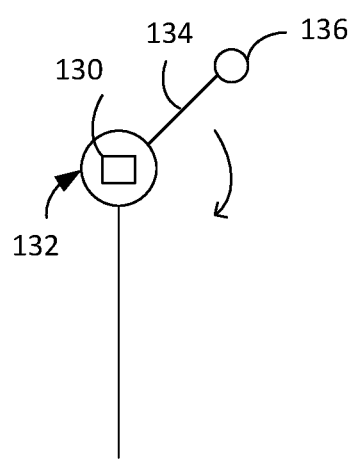
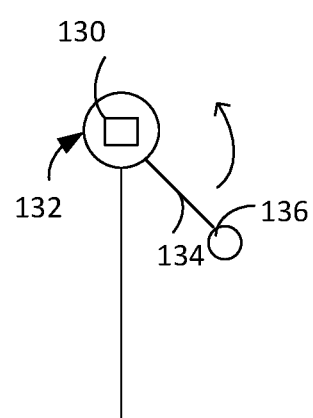
FIG. 8C  FIG. 8D

SYSTEMS AND METHODS FOR ADJUSTING VEHICLE LANE POSITION

RELATED APPLICATION

This application is a continuation-in-part of application Ser. No. 17/479,621, filed on Sep. 20, 2021, titled "Systems and Methods for Determining the Local Position of a Vehicle Using Radar," the entire contents of which are incorporated herein.

TECHNICAL FIELD

The present disclosure is directed to systems and methods for determining and adjusting a lane position of a vehicle or group of vehicles.

RELATED ART

Radar technology has been incorporated in many autonomous vehicles to aid in safe navigation. Generally, these radar systems include a transmitter that sends out radio waves and a receiver that detects the returning waves after they encounter an object. An autonomous vehicle, such as an autonomous automobile, then may determine the speed and distance of the object and, optionally, perform actions related to that information. For example, upon detecting an object within the trajectory of a vehicle, the vehicle may alert the driver or pilot, perform evasive actions to avoid a collision (e.g., when the vehicle is autonomous), or a combination of these or other actions. Further, radar systems in vehicles often work in conjunction with other sensing systems, such as cameras, to gather information related to the vehicle's environment and performance.

Current autonomous vehicle sensing systems primarily serve to aid in safe navigation by sensing the surroundings of a vehicle. For example, a uniform scan may be performed to range and detect objects in proximity to the vehicle. The sensing is often undertaken using cameras that interpret environmental details visually, and with optional assistance from other sensing systems. Cameras can detect visual detail such as the presence of signs, animals, vehicles, or road dividers and boundaries. However, cameras are limited by the potential for visual impairment due to poor weather conditions and low light, and visual data may not be sufficient for the detection of all relevant objects. Lidar (light detection and ranging) and radar (radio detection and ranging) are useful sensing systems that may be used in conjunction with visual detection systems due to their ability to operate advantageously in different navigational situations. For instance, lidar can detect small objects with high precision, while radar functions well over long distances and in a wide range of weather conditions. While current applications of radar in autonomous vehicles are useful, other potentially valuable applications remain underdeveloped or unexplored. The present disclosure is directed to radar-based sensing systems and methods for implementation on vehicles. These radar systems and methods function as an improvement over the current vehicle sensing systems by conveying a wider range of information for interpretation by vehicle controller systems.

BRIEF DESCRIPTION OF DRAWINGS

The present disclosure can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 8A is a schematic illustration of an exemplary embodiment of radar reflective markers, such as are depicted by FIG. 1, where a characteristic of marker spinning frequency or speed conveys unique and unambiguous information to a vehicle.

FIG. 8B is a schematic illustration of an exemplary embodiment of radar reflective markers, such as are depicted by FIG. 1, where a characteristic of marker spinning frequency or speed conveys unique and unambiguous information to a vehicle. Marker element position has rotated relative the position in FIG. 8A.

FIG. 8C is a schematic illustration of an exemplary embodiment of radar reflective markers, such as are depicted by FIG. 1, where a characteristic of marker rotating frequency or speed conveys unique and unambiguous information to a vehicle.

FIG. 8D is a schematic illustration of an exemplary embodiment of radar reflective markers, such as are depicted by FIG. 1, where a characteristic of marker rotating frequency or speed conveys unique and unambiguous information to a vehicle. Marker element position has rotated relative the position in FIG. 8C.

8D, where a characteristic of marker frequency or speed conveys unique and unambiguous information to a vehicle.

Figure 11:
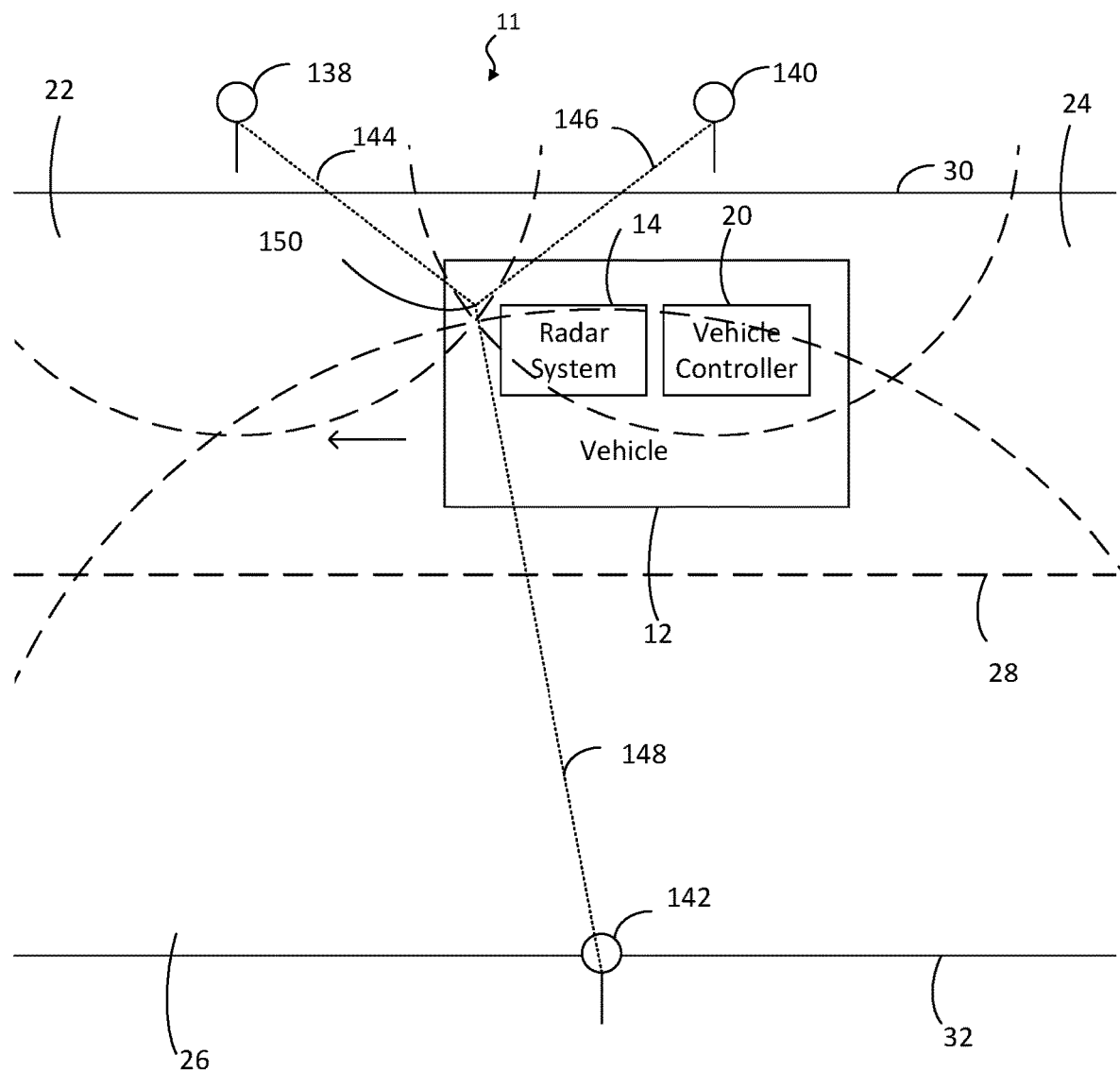

FIG. 11 is a schematic illustration of an exemplary embodiment of a radar-based information system of the present disclosure, where multilateration is employed using several markers to determine the location of a vehicle.

Figure 12:
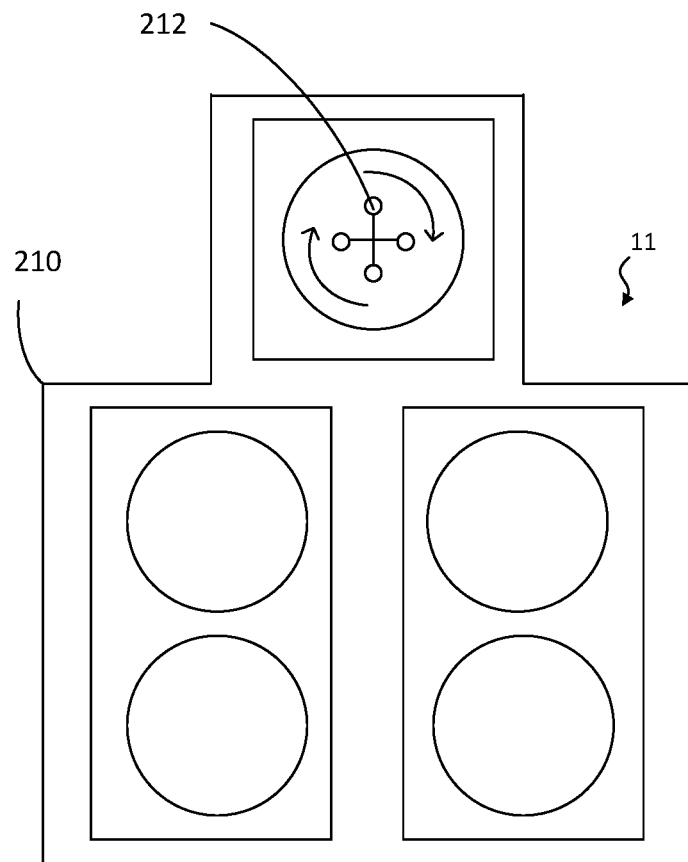

FIG. 12 is a schematic illustration of an exemplary embodiment of a radar-based information system of the present disclosure, where spinning actuated markers are present in a traffic light to indicate a state (e.g., color) of the light.

Figure 13:
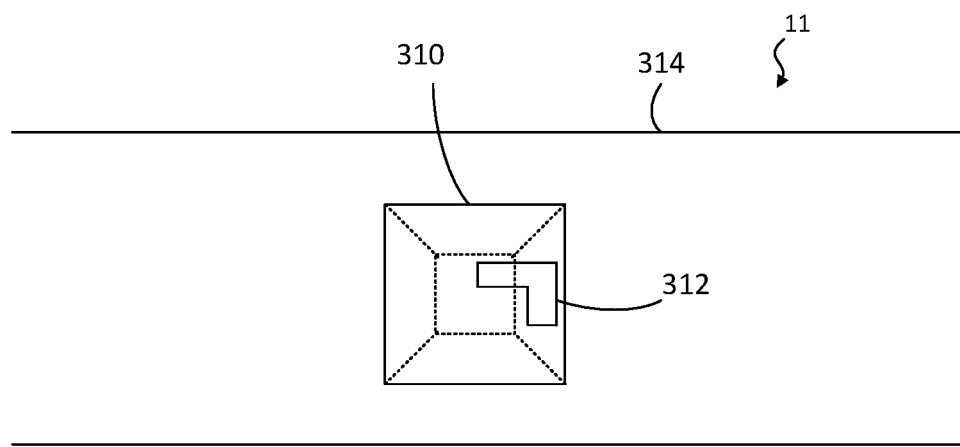

FIG. 13 is a schematic illustration of an exemplary embodiment of a radar-based information system of the present disclosure, where a radar reflective marker is embedded in a lane to convey unique and unambiguous information to a vehicle.

Figure 14:
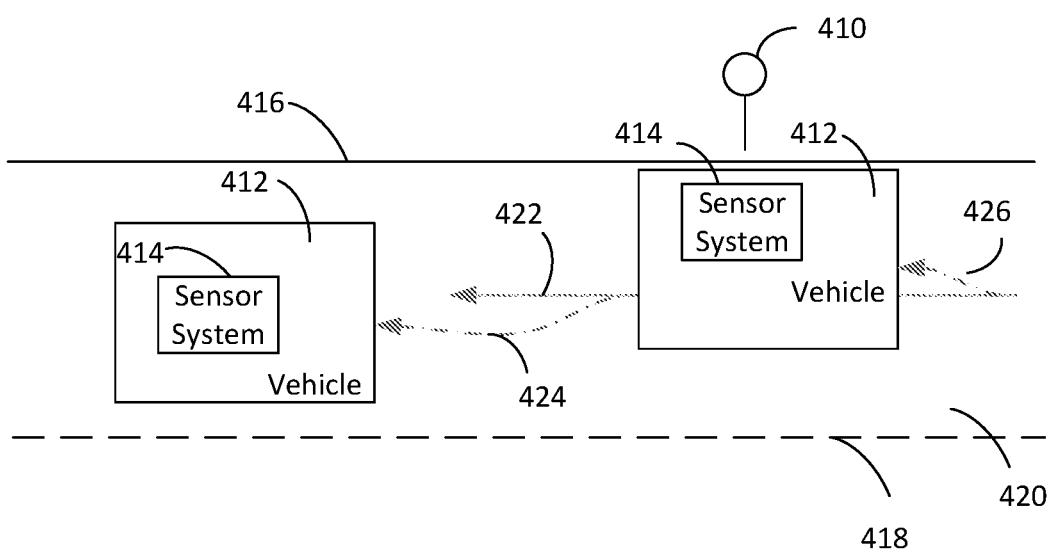

FIG. 14 is a schematic illustration of an exemplary embodiment of a lane positioning system of the present disclosure, where a vehicle sensor system detects lane boundaries and, optionally, traffic or roadway information, and adjusts vehicle lane position in response. An initial trajectory is shown as a dotted line path, while a left shifted or right shifted trajectory is shown as a dot-dashed line path.

Figure 15:
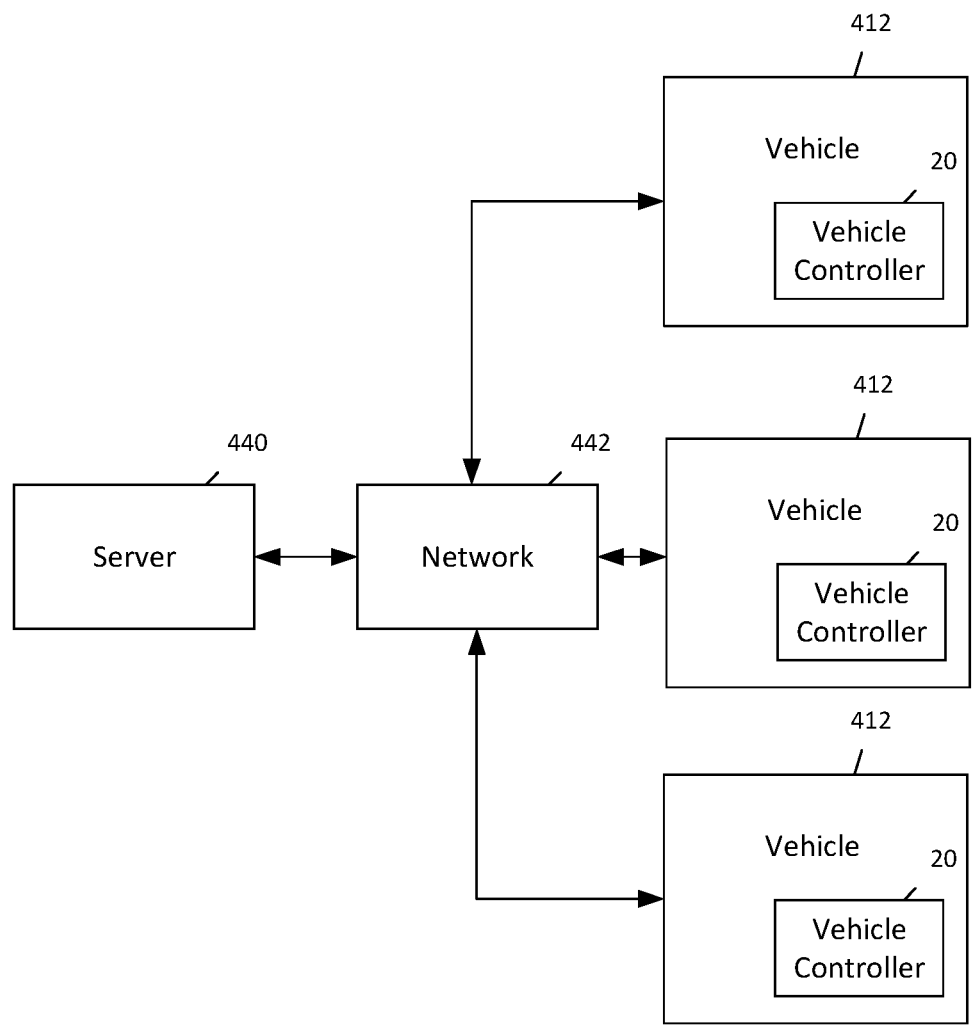

FIG. 15 is a block diagram illustrating components of a communication system for determining and adjusting lane position for one or more vehicles, such as is depicted by FIG. 14.

Figure 16:
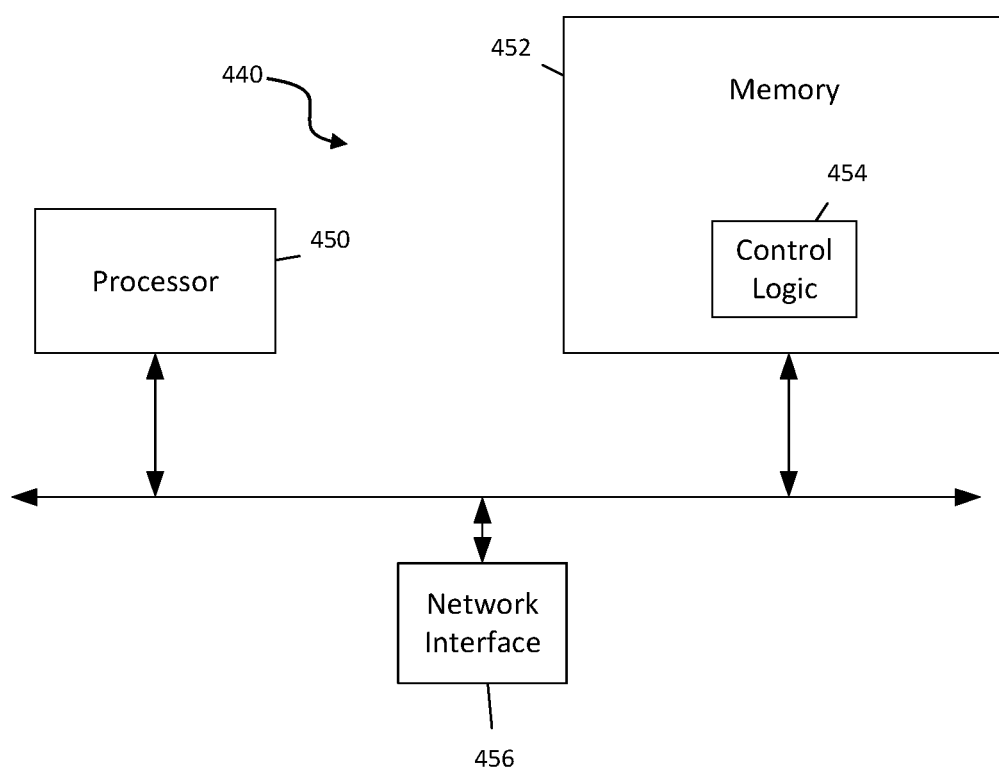

FIG. 16 is a block diagram illustrating an exemplary embodiment of a server, such as is depicted by FIG. 15.

Figure 17:
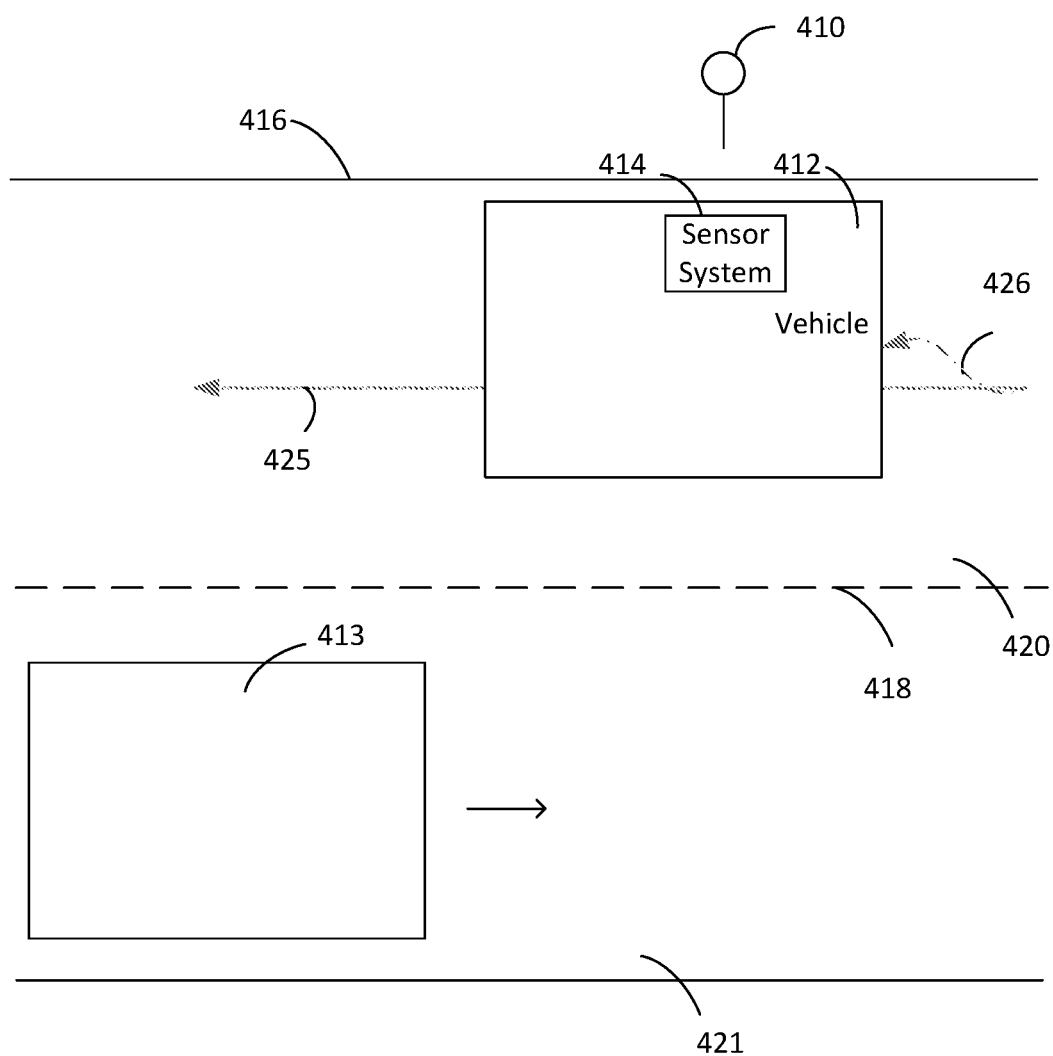

FIG. 17 is a schematic illustration of an exemplary embodiment of the lane positioning system of FIG. 14, where the vehicle sensor system additionally detects nearby or oncoming traffic, and adjusts vehicle lane position in response. A central lane position trajectory is shown as a dotted line path, while a second trajectory is shown as a dot-dashed line path.

Figure 18:
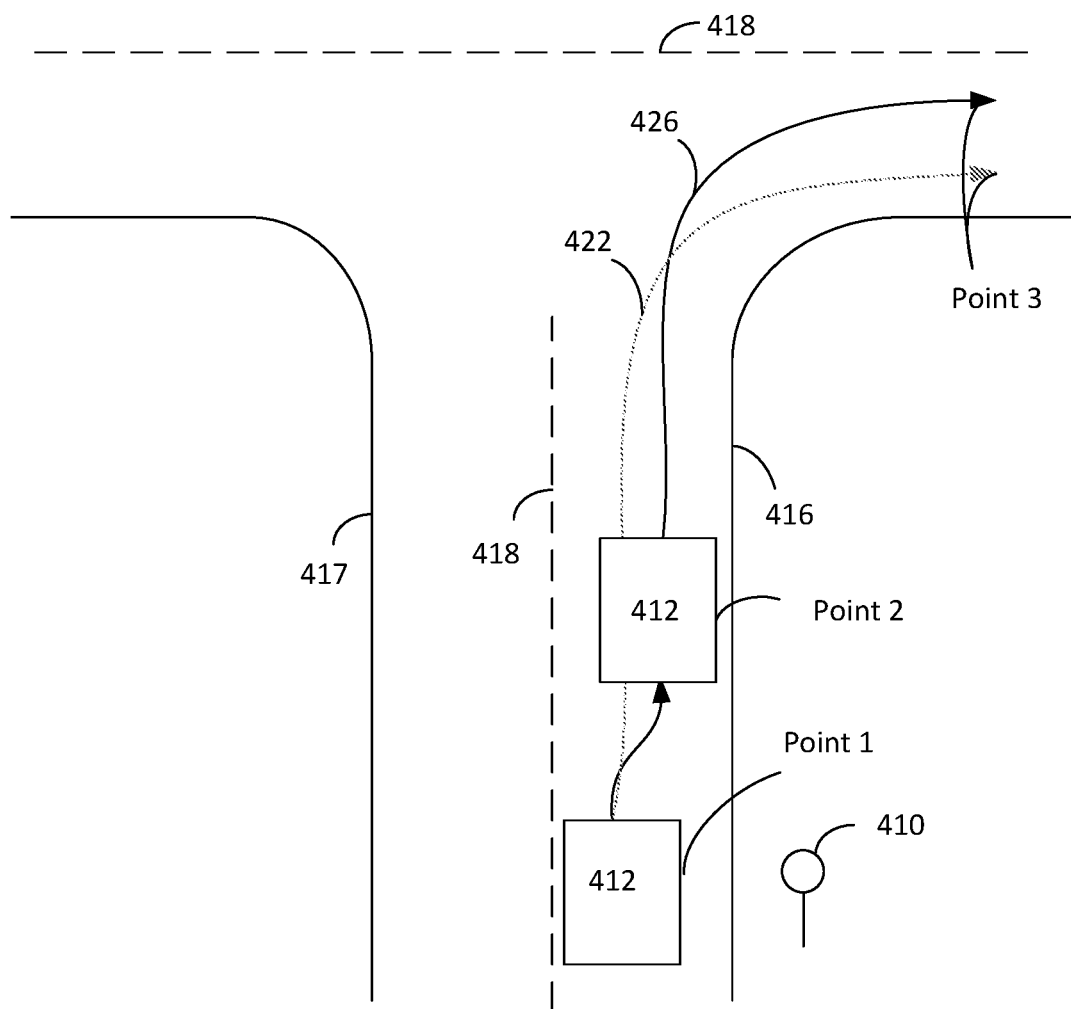

FIG. 18 is a schematic illustration of an exemplary embodiment of the lane positioning system of FIG. 14, where the vehicle sensor system additionally detects nearby or upcoming traffic signals, roadway features, or intersections, and adjusts vehicle lane position in response. An initial trajectory is shown as a dotted line path, while a second trajectory is shown as a solid line path.

Figure 19:
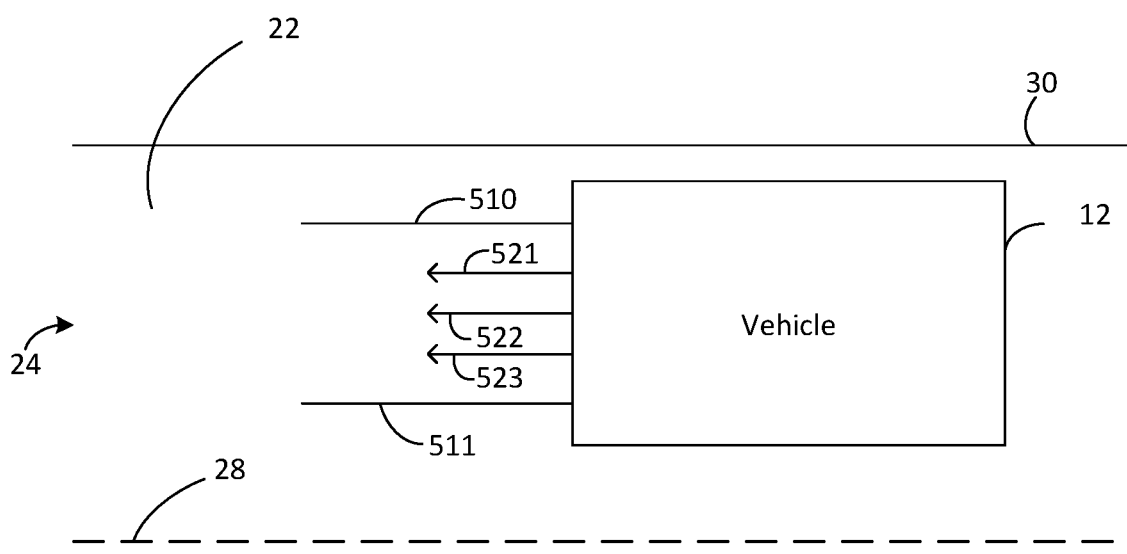

FIG. 19 is a schematic of a vehicle traveling along a lane of a roadway.

DETAILED DESCRIPTION

The present disclosure is generally directed to systems and methods for communicating information to vehicles with radar using spatially-encoded markers. In some embodiments of the present disclosure, radar reflective markers are located near or along a path usable by a vehicle, which can be autonomous or driven by a driver. The locations of the radar reflective markers are such that they are detectable using vehicle-based radar. A radar transmitter located on or within a vehicle produces one or more electromagnetic waves, such as radio waves, which then encounter the disclosed radar reflective markers and reflect off the markers. Reflected waves from a given marker return to a radar receiver on or within the vehicle, conveying unique and unambiguous information related to at least one characteristic of the radar reflective marker or spatial arrangement of radar reflective markers. In this manner, the vehicle may interpret the detected signals to indicate the location, speed, or lane position of the vehicle, as well as information about the vehicle's environment, such as mile markers, traffic direction, or adverse road conditions. Vehicles may utilize the information conveyed by the radar reflective markers in various ways, such as to provide an alert to a driver or passengers, perform evasive maneuvers, adjust vehicle velocity or position, or otherwise control the vehicle.

Figure 1:
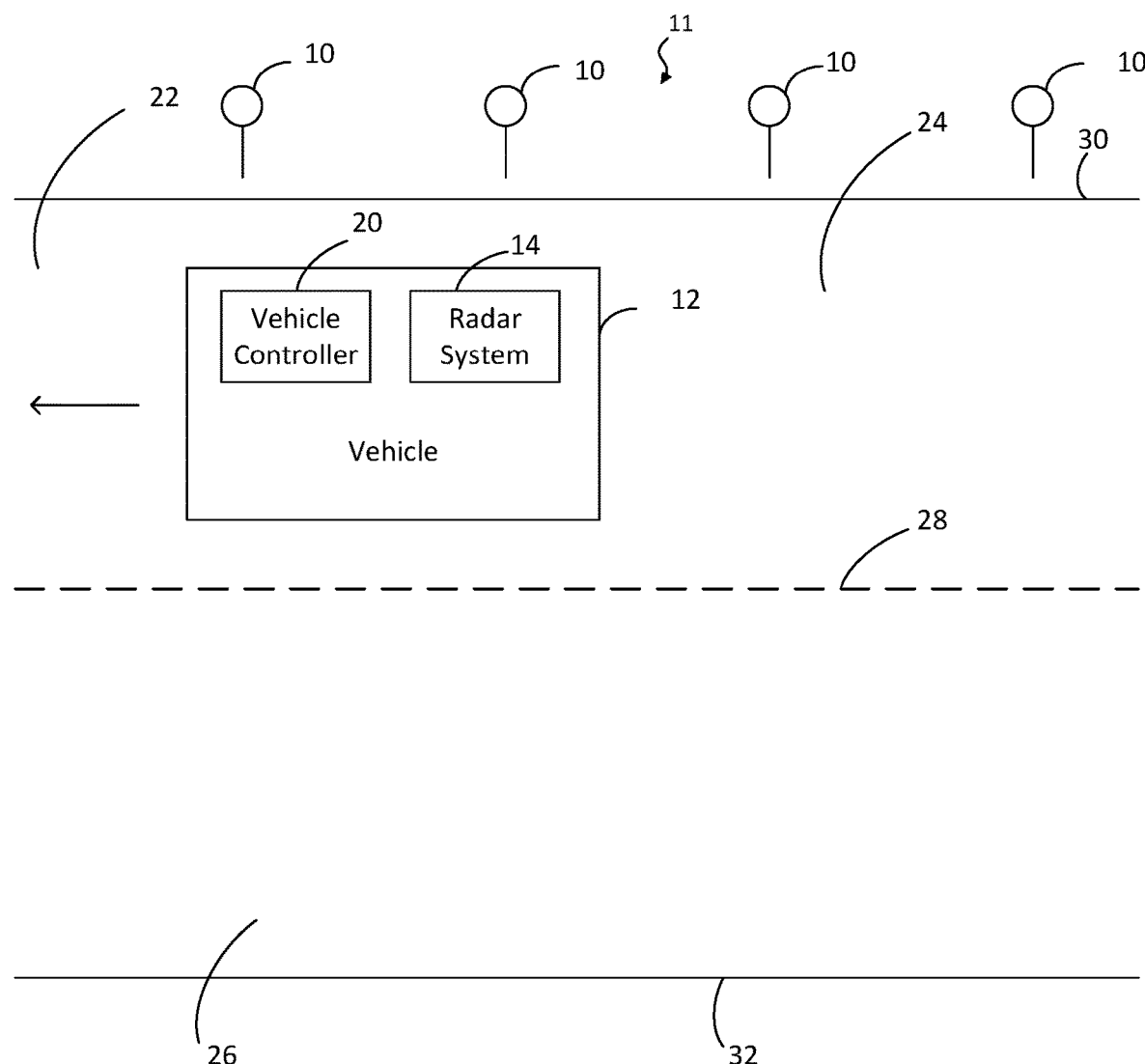
FIG. 1 is a schematic illustration of an exemplary embodiment of a radar-based information system of the present disclosure, with markers located outside of a radar-equipped vehicle to convey information to the vehicle.
Figure 2:
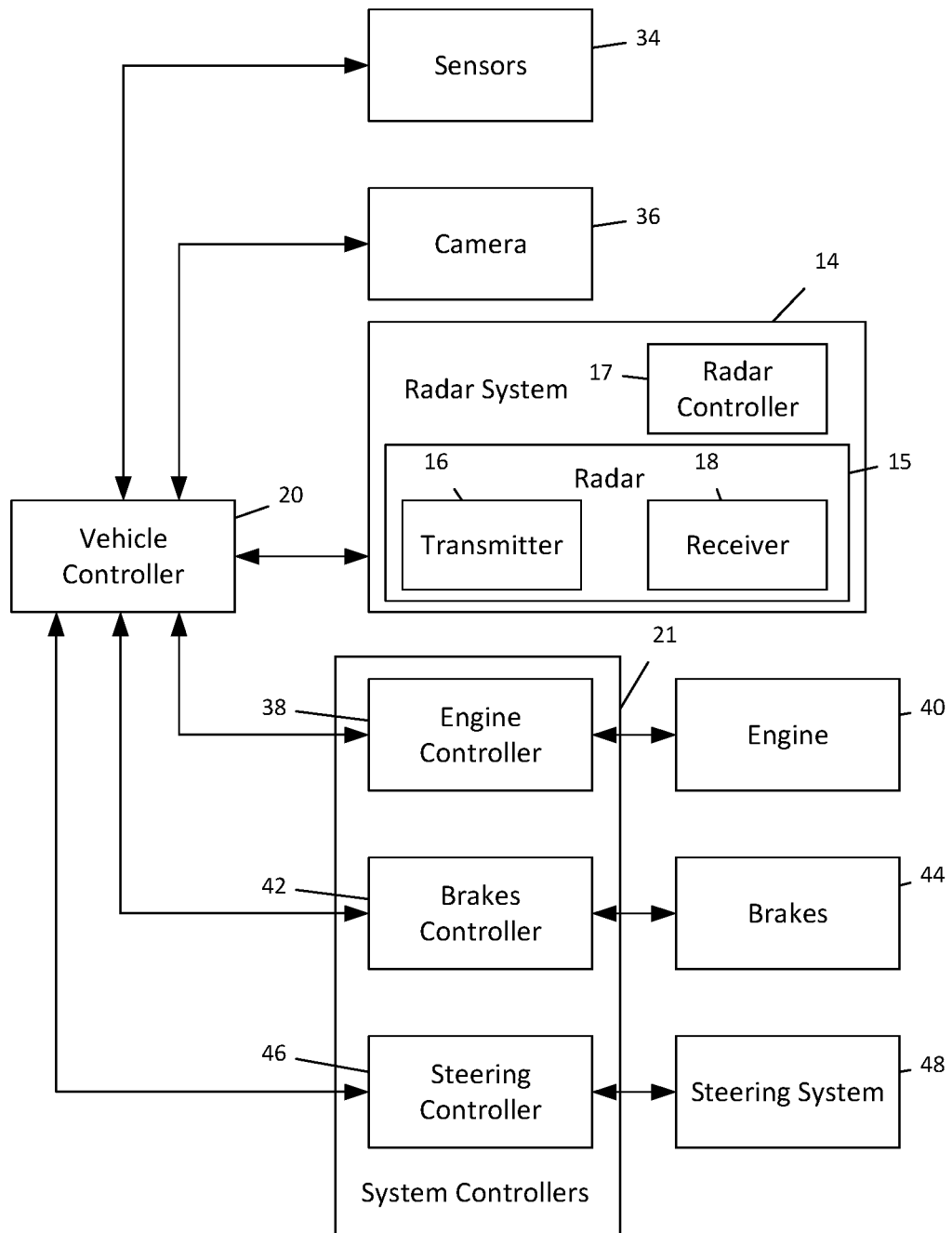
FIG. 2 is a block diagram illustrating components of a vehicle for detecting, interpreting, and reacting to information provided by radar reflective markers, such as are depicted by FIG. 1.
Figure 3:
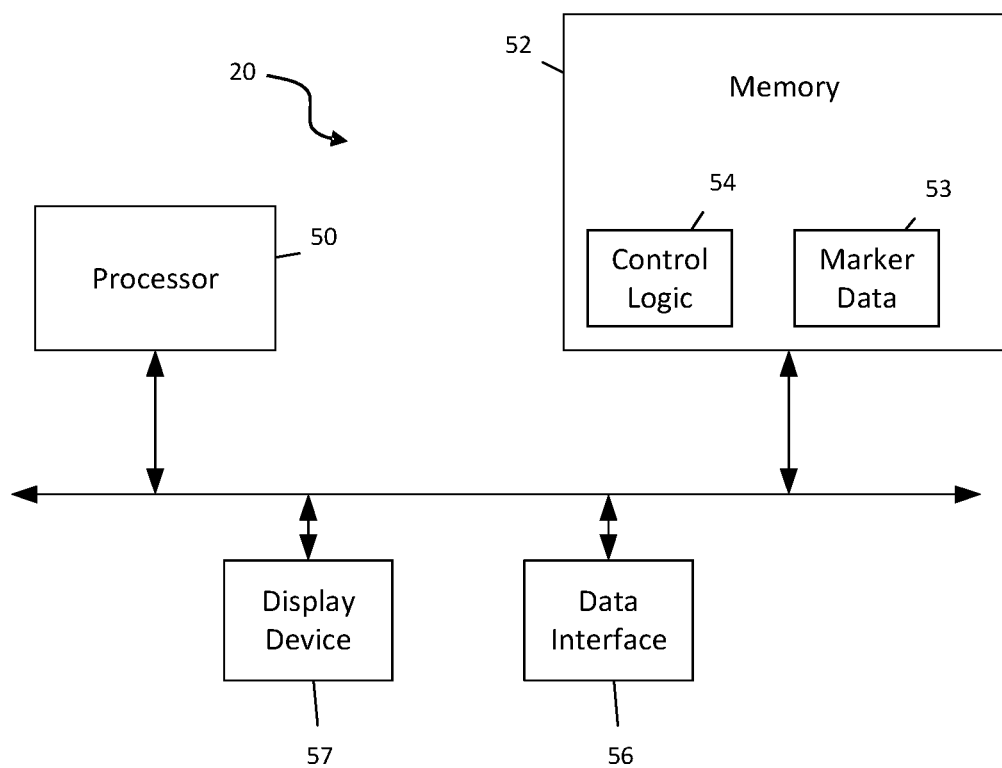
FIG. 3 is a block diagram illustrating an exemplary embodiment of a vehicle controller, such as is depicted by FIG. 2.

FIG. 1 depicts an exemplary embodiment of a radar-based information system 11 of the present disclosure. As shown by FIG. 1, the system 11 has radar reflective markers that are illustrated in a position to convey unique and unambiguous information to a vehicle equipped with a radar system. FIGS. 2-3 show components of the vehicle and a vehicle controller, respectively, for detecting, interpreting, and communicating information provided by the radar reflective markers. In FIGS. 4-10, the number, shape or shapes, and spatial relationship among the reflective markers or marker elements provide a unique radar signature that may be interpreted as coded information. FIG. 11 illustrates how radar reflective markers may be utilized through multilateration or other algorithms for determining the local position of a vehicle. FIG. 12 shows an embodiment of the present disclosure with an actuated spinning marker located within a traffic signal to provide traffic direction and signaling information through radar detection. In FIG. 13, another embodiment of the present disclosure includes radar reflective markers that are embedded in or on lane reflectors to provide lane location and vehicle positioning information.

As known in the art, the term "radar," which is also sometimes referred to as R.A.D.A.R or RADAR, refers to radio detection and ranging. Radar generally uses electromagnetic waves, such as radio waves, to detect objects and determine properties of the detected objects including, but not limited to, distance, angle, frequency, or velocity.

Referring to FIG. 1, radar reflective markers 10 are shown to be positioned proximate a roadway 22, such as along a side or shoulder of the roadway 22. However, markers 10 may be positioned in any location potentially detectable by a radar system 14, such as radar system 14 on a radar-equipped vehicle 12. Thus, markers 10 may be placed, either temporarily or permanently, proximate an intended path or trajectory of vehicles, including (but is not limited to) paved or unpaved paths, roadways, and parking locations or structures. Locations for markers 10 further include locations near, on, or in place of traffic signals, traffic signs or indicators, mile markers, infrastructure indicators, or other marking indicators or structures. In some instances, one or more markers 10 may be positioned relative to another object to indicate its position, as is discussed below in greater detail. In some instances, markers indicate lanes 24, 26, lane boundaries, or vehicle lane position relative boundaries such as road boundaries 30, 32 or a centerline 28, as is discussed below in greater detail.

Markers 10 are configured to be detectable using radar technology, and as such may be detectable in situations when visual detection systems are impaired. Such situations include inclement weather, such as snow cover, and low light conditions. Radar system 14 on vehicles 12 include a radar 15 with a radar transmitter 16 for transmitting electromagnetic waves, such as radio waves. Transmitted waves then encounter and reflect from objects in their proximity. According to the present disclosure, radar reflective markers 10 are configured to reflect transmitted waves back to vehicle 12 and for reception by a radar receiver 18 of radar 15, conveying a unique radar signature that identifies the object as a specific marker 10 (e.g., a marker 10 of a specific location or a marker 10 of a specific type), and in some cases the unique radar signature has encoded information that may provide a message corresponding to the marker 10. A controller 17 within radar system 14 may be used to determine object characteristic information. Notably, the information conveyed by a given marker 10 may be predefined or dynamically changed. Regardless of the type of information conveyed, the markers 10 may be differentiated from other objects detected by the radar system 14 by the unique radar signature of markers 10. Information conveyed to the vehicle by one or more of the markers 10 may be transmitted to a vehicle controller 20 for further interpretation, storage, communication, and/or direction of responsive actions.

Note that the controller 17 within the radar system 14 may be implemented in hardware or a combination of hardware with software and/or firmware. As an example, the controller may comprise one or more field programmable gate arrays (FPGAs) or application-specific integrated circuits (ASICs). In some embodiments, the controller 17 has software that is executed by one or more processors (not specifically shown) of the controller 17.

FIG. 2 depicts various components of the vehicle 12 depicted by FIG. 1, including a vehicle controller 20 that may be used to react to the information conveyed by one or more markers 10. The vehicle controller 20 may receive information regarding the vehicle's environment, operation, location, and other parameters from vehicle system controllers 21, as well as from sensors 34, cameras 36, and radar system 14. Vehicle system controllers 21 include, for example, engine controllers 38 for managing the operation of and communicating with engine 40, brakes controller 42 for managing the operation of and communicating with brakes 44, and steering controller 46 for managing the operation of and communicating with steering system 48. Vehicle controller 20 further communicates with cameras 36, sensors 34, and radar system 14 for the assessment of the vehicle's environment. Applications for cameras 36 include those related to vehicle environment and location sensing, and rely on visual identification and interpretation of the vehicle's exterior environment. Cameras 36 may operate with or without other sensors 34 or radar system 14 to provide environmental and vehicular information. For example, a camera 36 may visually detect the boundaries of a lane 24 in which vehicle 12 is traveling, while radar system 14 detects the presence of an object within the trajectory of vehicle 12 in lane 24. The information provided by both camera 36 and radar system 14 may be provided to the vehicle controller 20 to be interpreted and used to control the velocity and thus location of the vehicle 12. Other sensors 34 include, but are not limited to, accelerometers, tachometers, speedometers, global positioning systems (GPS), light detecting and ranging (LIDAR) systems, temperature sensors, emission sensors, pressure sensors, and fluid level sensors.

In FIG. 2, the vehicle controller 20 further communicates with vehicle system controllers 21 to receive information about vehicle operations and to direct the systems which are controlled by vehicle system controllers 21. For instance, the vehicle controller 20 may direct engine controller 38 to alter operations of engine 40 (e.g., thrust generated by the engine 40), brakes controller 42 to initiate, stop, or change the operation of brakes 44, or steering controller 46 to alter the direction of the vehicle using steering system 48. In some instances, vehicle controller 20 directs more than one system to alter vehicle operations simultaneously or otherwise.

Further, in FIG. 2 radar system 14 serves to process signals encountered from the environment of vehicle 12 and to provide data characteristics of objects to vehicle controller 20 for interpretation. Such characteristics include object size, shape, orientation, elevation, and range, though other characteristics are contemplated by the present disclosure. In processing signals from the radar 15, the radar controller 17 may determine object location information based on a local coordinate system relative to the vehicle 12, which may be further coordinated with a global coordinate system by the vehicle controller 20 or the radar controller 17 to determine global positioning. The data characteristics may be interpreted by the vehicle controller 20 or radar controller 17, as described in greater detail below. In some instances, information regarding markers 10 is determined by the radar controller 17 based on raw radar data from the radar 14 and is used by the radar controller 17 to identify markers 10, while in other instances marker identification may be undertaken by the vehicle controller 20 using raw radar data from radar system 14.

In a preferred embodiment, radar system 14 processes signals encountered from the environment of vehicle 12 and identifies markers 10 within the environment of vehicle 12. In radar system 14, radar controller 17 is configured to communicate with other elements within radar system 14, such as transmitter 16 and receiver 18. Radar controller 17 includes control logic that is implemented in software, as well as a processor configured to retrieve and execute instructions from the control logic to perform the functions ascribed herein to the radar controller 17. For instance, when raw data characteristics of an object or objects detected by radar system 14 are communicated to radar controller 17, radar controller 17 is configured to identify or reject the object or objects as a marker 10. This identification includes detection of object size, shape, location, number, or other characteristics indicative of a marker 10. Radar controller 17 receives raw radar data from the radar 15 and may use the raw radar data to determine the object's azimuth, elevation, range, Doppler, and micro-Doppler dimensions, which are interpreted by radar controller 17 to identify the object or group of objects as a marker 10 or other, non-marker object. Radar system 14 may communicate the identity of an object as a marker, as well as object characteristics of azimuth, elevation, range, Doppler, and micro-Doppler dimensions, to vehicle controller 20 for further calculations or identifications, as described below in greater detail.

FIG. 3 depicts an exemplary embodiment of the vehicle controller 20. The exemplary vehicle controller 20 depicted by FIG. 3 comprises control logic 54 that is configured to control the vehicle controller 20. The control logic 54 may be implemented in hardware, software, or any combination thereof. In the exemplary embodiment, depicted by FIG. 3, the control logic 54 is implemented in software and stored in memory 52 of the controller 20. However, other configurations of the control logic 54 are possible in other embodiments. The control logic 54 may be configured to process data from one or more sensors or vehicle systems, calculate or determine values or parameters from the data, store information in memory 52, and process information from the radar system 14 (FIG. 2), as will be described in more detail below.

As shown by an embodiment in FIG. 3, the vehicle controller 20 may have at least one processor 50 configured to communicate with and drive other elements within the controller 20 via at least one bus. As an example, the processor 50 may be a digital signal processor (DSP), central processing unit (CPU), or any instruction execution apparatus that is configured to retrieve and execute instructions from memory 52. As an example, when the control logic 54 is implemented in software, the processor 50 may be configured to retrieve and execute instructions from the control logic 54 to perform the functions ascribed herein to the vehicle controller 20. For instance, when raw data characteristics of an object or group of objects detected by radar system 14 are communicated to vehicle controller 20, control logic 54 may be implemented to identify or reject the object or group of objects as a marker 10. Further, control logic 54 may determine that the characteristics of a marker 10 convey a unique signature corresponding to an entry or entries in memory 52. Further still, control logic 54 may determine a message that is encoded by the marker 10, such as a warning, an identifier (e.g., marker or location identifier), notification, or other type of message. Note that in some instances, the encoded message may be a pointer that can be used to retrieve information from a database or other type of memory, such as a warning, an identifier, a notification, or any other type of information described herein.

As shown by FIG. 3, marker data 53 may be stored in memory 52 and used by the control logic 54. The marker data 53 includes information related to the markers such as marker identifiers, marker locations, or other messages to be conveyed by the markers. For example, the marker data 53 may store an identifier of each marker in a particular region that a vehicle 12 may encounter. As an example, as the vehicle 12 enters a certain geographic region, the marker data 53 corresponding to that region may be downloaded from a remote server and stored in memory 53 for use while the vehicle 12 remains in that region. In some embodiments, the marker data 53 correlates each marker identifier within information indicative of the radar signature expected for the identified marker. Thus, upon detecting a signature of a given marker, the marker data 53 may be consulted to determine the marker identifier that is correlated with the signature.

In some embodiments, other types of information may be correlated in the marker data 53 with the marker identifier or the information indicative of the radar signature. As an example, a predefined message may be correlated with the marker identifier or signature. Thus, upon identifying a marker or its signature, the marker data 53 may be used to lookup a message to be conveyed by the marker. In some cases, the location of the marker may be correlated with the marker identifier or signature. Thus, upon identifying a marker or its signature, the marker data 53 may be used to lookup the marker's location. Such location may be indicated by coordinates, such as latitude and longitude, or other types of location information. Various other information about the markers may be indicated by the marker data 53 in other embodiments.

Note that in some embodiments, the radar system 14 may provide raw radar data to the vehicle controller 20, which analyzes the radar data to determine radar signatures and to compare the radar signatures to the marker data 53 to identify the markers that produced the signatures and/or messages associated with the signatures. In other embodiments, the controller 17 of the radar system 14 may be configured to process the raw radar data and to provide information indicative of the detected signatures, messages associated with the signatures, or identifiers of the markers that produced the signatures. Notably, the functions of processing and analyzing radar data may be performed by or distributed across the vehicle controller 20 and/or the radar controller 17 as may be desired. Specifically, any functions described herein as being performed by the vehicle controller 20 may be perform instead by the radar controller 17, and any function described herein as being performed by the radar controller 17 may be performed by the vehicle controller 20. Further, any number of controllers may be used to perform such processing and analysis. As an example, a single controller may receive raw radar data from the radar 15, process the raw radar data to determine information about objects in the environment, identify markers, and control the vehicle based on the identified markers.

In FIG. 3, a data interface 56 is provided to receive inputs from and convey outputs to systems and devices within vehicle 12. As an example the data interface 56 may be communicatively coupled (wired or wirelessly) to the sensors 34, camera 36, vehicle system controllers 21, and the radar system 14 depicted by FIG. 2, thereby enabling the controller 20 to communicate with any of these vehicle components. The controller 20 may also have a display device 57, such as a liquid crystal display (LCD), for displaying information. As an example, the controller 20 may display messages conveyed from one or more markers or otherwise determined from the conveyed information to occupants of the vehicle 12. For example, speed limit information, road hazard information, or other information pertinent to the operation of the vehicle 12 may be displayed to an occupant, such as a driver of the vehicle 12.

Figure 4:
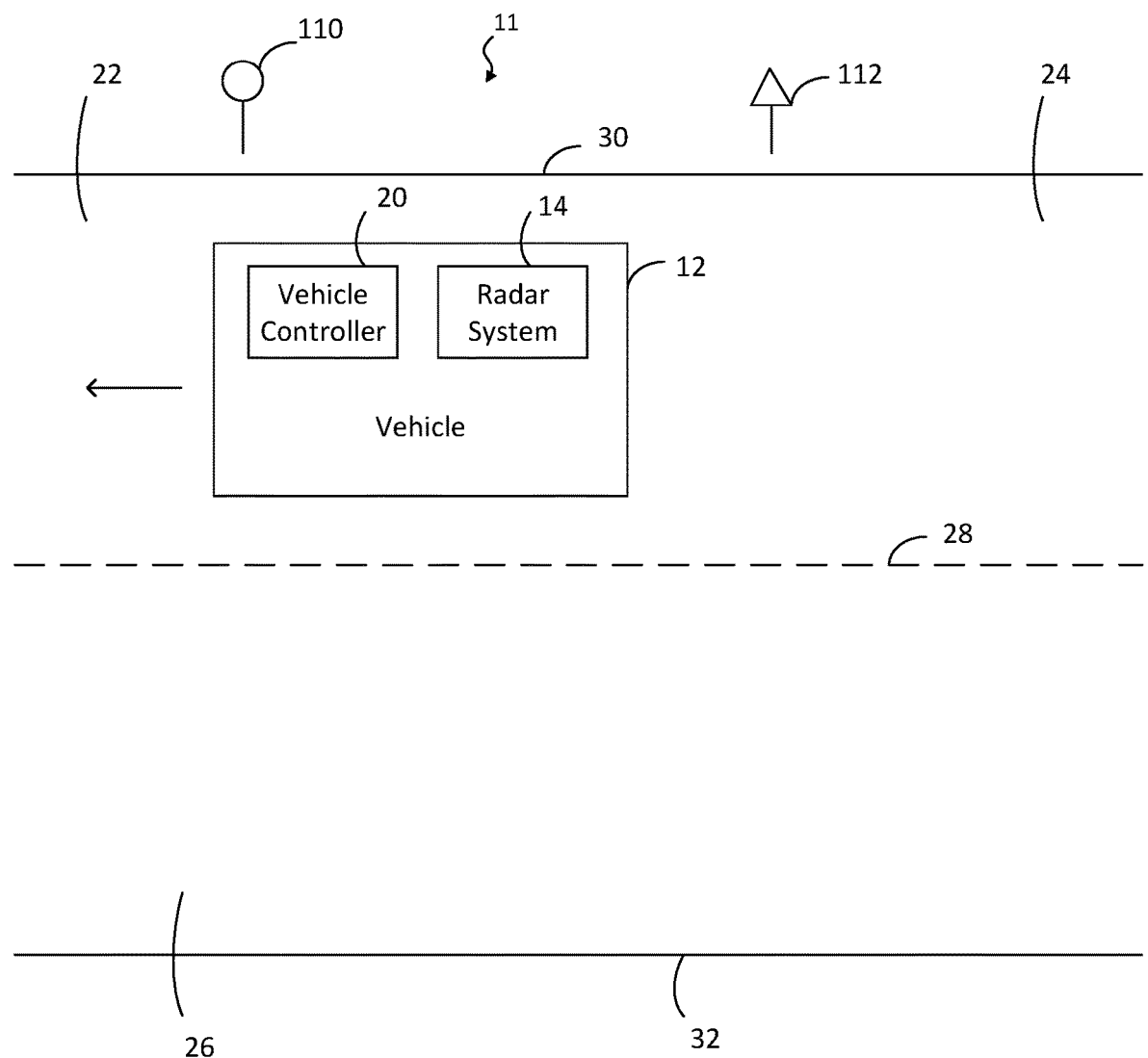
FIG. 4 is a schematic illustration of an exemplary embodiment of a radar-based information system of the present disclosure, where a characteristic of marker shape conveys unique and unambiguous information to a vehicle.

Referring to FIG. 4, the vehicle 12 is positioned to detect unique radar signatures corresponding to multiple markers 10, such as a first marker 110 and a second marker 112. In the depicted embodiment, the markers 110 and 112 have different shapes, which correspond to unique identities and radar signatures. However, as described in greater detail below, other characteristics of markers 10 may be used to provide unique signatures and encode distinct information. Different types of marker characteristics, such as shape, location, distance or spacing from other markers, number of reflective elements, relative positions of reflective elements, actuated speed, and actuated frequency, may be used to convey distinct encoded information. The encoded information from markers 10 may include a pointer to one or more database entries, where the one or more database entries may include any information suitable for use in a system incorporating one or more of the radar markers. In some instances, more than one marker characteristic may be used to convey more than one type or encoded information. In some instances, more than one marker 10 is used to convey encoded information.

In a non-limiting example of marker characteristics for conveying encoded information, marker shape and orientation may be used to convey traffic regulations, such as a speed limit. In such an exemplary situation, a triangular shaped marker 112 may be recognized as corresponding to speed limits based on the marker shape. Further, the pattern or orientation of the triangle of marker 112 may convey the numerical value of the speed limit, such as a vertex facing downward indicating a value of 25 miles per hour or a vertex facing upwards indicating a value of 65 miles per hour. In this example, radar system 14 detects marker 112 and its characteristic shape, size, and orientation and provides this information as raw data to vehicle controller 20. From the raw data, vehicle controller 20 implements control logic 54 to recognize marker 112 as a marker and to identify the unique signature provided by marker 112, and then looks up all corresponding information from memory 52 related to the identified unique signature.

Additional non-limiting examples of the encoded information or the database entries may include a surveyed location, a specific location, structure, or other object along a thoroughfare, including a roadway, bridge, or tunnel, one or more of a distance and direction to an object, coordinates of the marker or an object in Earth Centered Earth Fixed (ECEF) reference frame.

The disclosed radar markers 10 may be utilized by radar system 14 with sufficient resolution in one or more of azimuth, elevation, range, Doppler, and micro-Doppler dimensions to discern the spatial information provided by the reflector elements in the same one or more dimensions. Alternately, radar markers 10 may be configured with a particular spacing in one or more of azimuth, elevation, range, Doppler, and micro-Doppler dimensions that allows the radar with a particular resolution in the same one or more dimensions to discern the spatial information provided by the reflector elements. In embodiments with a higher resolution radar, the marker spacing may be relatively smaller, while in embodiments with a lower resolution radar, it may be desirable for the marker spacing to be relatively larger to allow the radar system 14 to discern the desired characteristics for conveying information.

An example of a radar system 14 that may be used with the vehicle 12 is a 2-D MIMO sparse array system with a sparse array selected to minimize interpolation error of Doppler signals at virtual and missing array elements, which receives a Range-Doppler bin of radar return signals from one or more radar markers 10. The exemplary system estimates signals at virtual and missing 2D array elements, processes the signals at the virtual positions, obtains optimal estimates of principle target scatterers in elevation, azimuth, angles, and power, and renders and displays an ultra-high angle resolution of Doppler features of the one or more radar markers 10. The features may be analyzed and compared to a database of known features, or may be interpreted to realize the information encoded in the return signals. Further, the 2-D MIMO sparse array system provides at least an order of magnitude improvement in resolution of detected objects, allowing markers 10 to be recognized with smaller sizes than would be possible with other radar systems. Smaller markers 10 may result in a reduction in marker costs, permitting radar-based information system 10 to be implemented at a significantly lower cost. Exemplary 2-D MIMO sparse array systems are described in commonly-assigned U.S. application Ser. No. 17/375,994, entitled "Methods and Systems for Processing Radar Signals" and filed on Jul. 14, 2021, which is incorporated herein by reference. In other embodiments, other types of radar may be used.

Referring again to FIG. 4, marker shape, as indicated by the circular shape of marker 110 and triangular shape of marker 112, may be used to convey a unique radar signature for each marker 110, 112. For example, radar system 14 detects marker 110 to have a unique signature based on its circular shape, which may indicate that the marker 110 represents or defines a mile marker or position along roadway 22, while it detects marker 112 to have a different radar signature based on its triangular shape, which may indicate that the marker 112 represents or defines a speed limit for roadway 22. When marker 112 represents a speed limit, speed values may be further indicated by the size of marker 112, with particular sizes representing particular speed values. Other potential encoded information includes, but is not limited to road construction status, infrastructure locations, hazard information, weather information, mile markings, location information, speed limits, or other road, vehicle, or environment characteristic.

Figure 5:
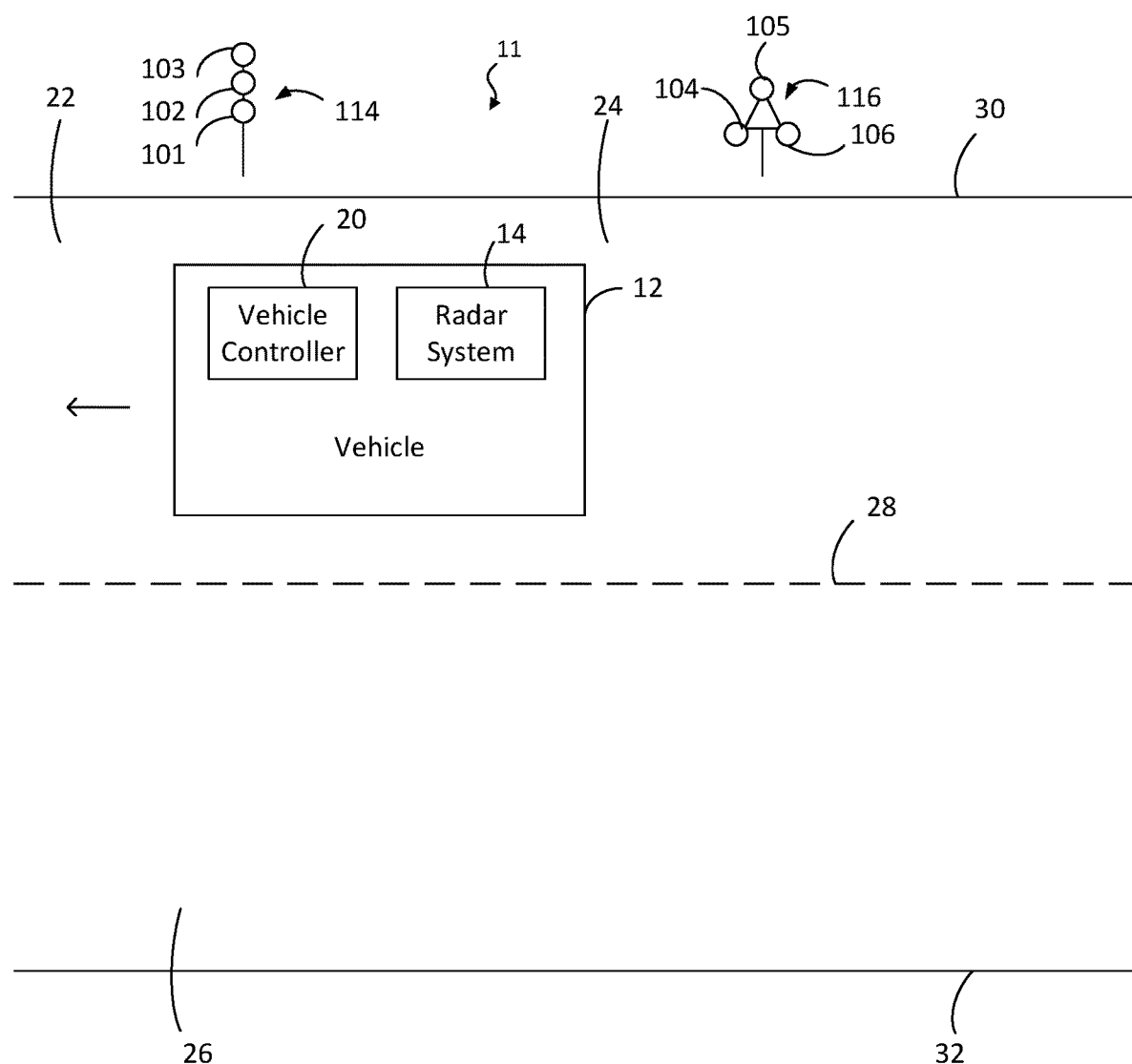
FIG. 5 is a schematic illustration of an exemplary embodiment of a radar-based information system of the present disclosure, where a characteristic of marker spatial configuration conveys unique and unambiguous information to a vehicle.

Referring to FIG. 5, reflector elements are included with a unique spatial pattern to provide a unique radar signature for markers 114 and 116. As an example, the multi-element marker 114 shown by FIG. 5 has three elements 101-103, and the multi-element marker has three elements 104-106. Each element 101-106 has a unique shape to facilitate identification of the element from other objects that may be in the environment. In the exemplary embodiment shown by FIG. 5, each element 101-106 has a circular shape with a predefined diameter and is spaced apart from the other elements of the same marker within a predefined range. As an example, each element 101-103 of marker 114 may be spaced from the next adjacent element 101-103 of the same marker 114 by no more than a threshold distance (e.g., about three inches). Thus, if the radar system 14 determines that a signature indicates that there are multiple circular objects of the predefined diameter that are positioned within at least a threshold distance of each other, then the radar system 14 may determine that the objects represent elements 101-103 of an encoded marker. Thereafter, the radar system 14 may analyze the spatial arrangement of the elements 101-103 or other characteristics of the marker to determine information conveyed by the marker. Note that FIG. 5 shows each marker 114 and 116 as having three elements, but a multi-element marker may have any number of elements in other embodiments.

As indicated above, after having identified a marker 114 or 116, the radar system 14 may analyze the spatial arrangement of its elements in order to decode information from the marker. As an example, the elements 101-103 of marker 114 are arranged in a straight line, whereas the elements 104-106 of marker 116 are arranged in a triangular pattern. The unique spatial pattern of marker 114 (i.e., three elements in a straight line) may convey certain information, and the unique pattern of marker 116 (i.e., three elements in a triangular pattern) may convey different information. Thus, by identifying the spatial pattern of the elements of a given marker, the radar system 14 can determine the information that is conveyed by the marker.

As an example, each spatial pattern may be unique to and indicate a marker type, such as a certain type of roadside sign. For example, the spatial pattern defined by the marker 114 may correspond to a stop sign indicating that the vehicle 12 should temporarily come to a stop at or near the marker 114, whereas the spatial pattern defined by the marker 116 may correspond to a yield sign indicating that the vehicle 12 should yield to other traffic at or near the marker 116. Various other marker types are possible in other embodiments. As an example, the spatial pattern of a marker may indicate that a hazard (e.g., a traffic accident, construction zone, or sharp turn) is close to the marker or is down road from the marker a short distance (e.g., 500 feet), thereby warning the driver of vehicle 12 or the vehicle controller 20 of the hazard so that appropriate action can be taken (e.g., decrease in speed).

In some embodiments, the spatial pattern of a marker may indicate only a portion of a message. As an example, multiple markers may be used to convey a message where each marker represents a portion, such as a digit, character, word, or phrase, of a message. As an example, the two markers 114 and 116 may form a speed limit message to convey the speed limit for the area in which the markers 114 and 116 are located. In such example, the marker 116 may convey a numerical value or digit (e.g., "6") and the marker 114 may convey another numerical value or digit (e.g., "5") such that a certain speed limit (e.g., 65 miles per hour) is conveyed by the two markers 114 and 116. In such example, the proximity of the markers 114 and 116 relative to one another may indicate that they are part of the same message. As an example, the radar system 14 may be configured to determine that two consecutive markers that are less than a threshold distance from each other are part of the same message. Other techniques for utilizing unique spatial patterns to convey information are possible in other embodiments.

Figure 6:
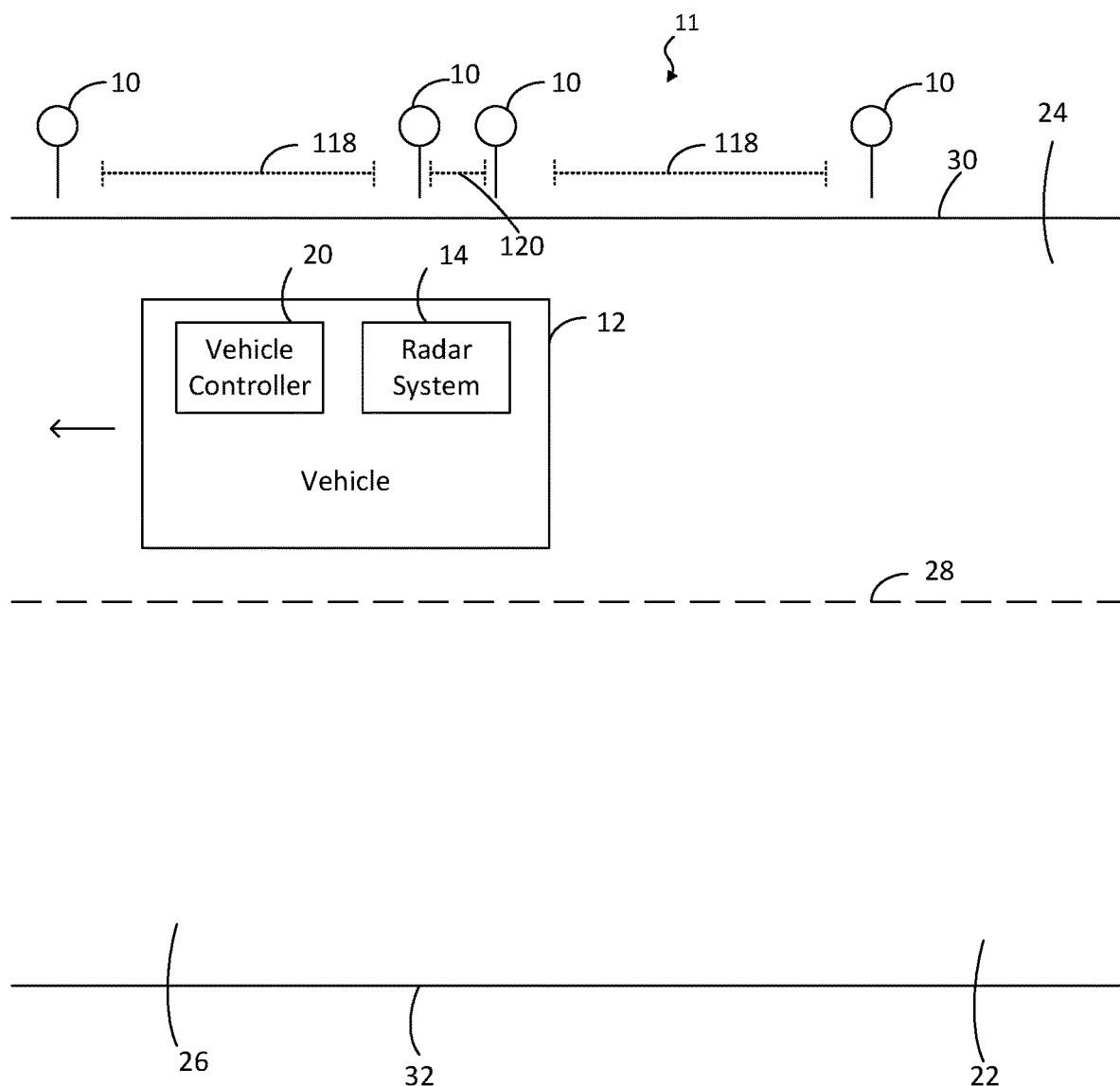
FIG. 6 is a schematic illustration of an exemplary embodiment of a radar-based information system of the present disclosure, where a characteristic of marker spacing conveys unique and unambiguous information to a vehicle.

In FIG. 6, markers 10 include different spacings 118, 120, which convey unique radar signatures and distinct information from the markers 10. Markers 10 are detected by radar system 14 and their local position is determined. Vehicle controller 20 then determines spacings by recognizing each object or group of objects as a marker and, through control logic 54, recognizes spacing between each marker 10 as a unique signature. Thus, spacings of one length may correspond to first information, while spacings of a second length may correspond to different information. Further, a group of objects may indicate several markers 10 with different spacings providing further information, or may identify a group of objects with a certain spacing or organization as indicating one marker having a particular signature.

In the example depicted in FIG. 6, larger spacing 118 provides a first encoded message or parameter, while smaller spacing 120 provides a second encoded message or parameter. The first encoded parameter may, for example, indicate a higher speed limit, while the second encoded parameter may indicate a lower speed limit. Thus, vehicle controller 20 receives information based on the spacings of markers 10 that allows for control of vehicle systems 21 or for communication of such information to a driver or passenger of vehicle 12.

In another non-limiting example, spacing between markers 10 may directly encode messages. Modulation of spacings may be undertaken to form a binary or other type of pattern, which is recognized using control logic 54. As an example, a larger spacing 118 may indicate a binary "1", while a smaller spacing 120 may indicate a binary "0". All marker spacings within a particular range may then be interpreted as a binary message that can indicate unique information, such as an alert to road or traffic conditions. The message may be used to access a predetermined stored in memory 52 (e.g., point to a database entry or other memory location where a predefined message is stored), or may define a new message encoded using binary (e.g., the binary pattern defines a new message being conveyed).

Figure 7:
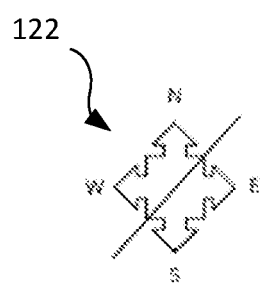
FIG. 7 is a schematic illustration of an exemplary embodiment of a radar reflective marker, such as is depicted by FIG. 1, where a directional-shaped marker conveys unique and unambiguous information to a vehicle.

In FIG. 7, directionally-shaped marker 122 is provided to convey information based on its shape. For instance, pointers may extend to specific cardinal directions, east, west, north, and south, and an indicator may be detectable on or between pointers to provide directional information to vehicle 12.

Now referring to FIGS. 8A-8D, actuated markers 124 and 132 are depicted, respectively. In both depicted examples, markers 124 and 132 are driven by an actuator 130, which provides motion that is interpreted as a unique radar signature. Actuator operation is described in more detail below. Actuation includes the movement of one or more elements 128, 136 about a point of rotation, such as by the movement of arms 126, 134. Movement may include full rotation about a point of rotation or rotation within a range of angles about a point of rotation. Movement includes increases or decreases in speed or velocity, or changes in rotational direction. Actuation may further include a cessation of motion of elements 128, 136. Elements 128, 136 are depicted as circular and as attached to arms 126, 134 that pivot about a central point of rotation in FIGS. 8A-8D, though other element and arm shapes, sizes, lengths, numbers, and positions are compatible with the present disclosure.

Figure 10:
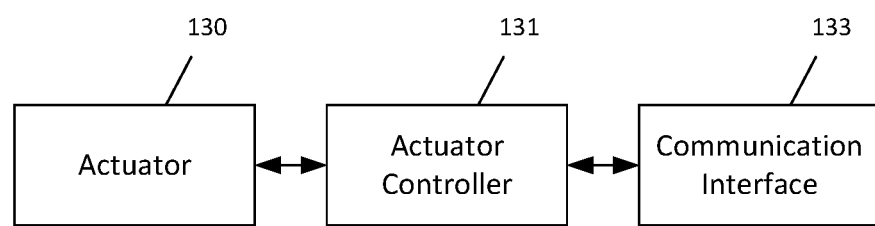
FIG. 10 is a block diagram illustrating components of actuated markers of FIG. 8A, FIG. 8B, FIG. 8C, and FIG.

FIG. 10 depicts components of an actuator marker in greater detail. Actuator 130 is attached to moving elements of an actuator marker either directly or indirectly, such as to arms 126, 134. An actuator controller 131 communicates with actuator 130 and with a communication interface 133. Controller 131 receives information to communicate via marker actuation from communication interface 133, which may allow a user to transmit a message locally at the marker or remotely using wireless communication. Thus, actuator markers are capable of receiving a message from a remote location (e.g., a remote server) and delivering the message to one or more vehicles. The message may be updated or changes as may be desired. After a message is provided by the communication interface 133, actuator controller 131 directs actuator 130 to impart a corresponding motion or pattern of motion to convey the message. Thus, different element positions, rotational frequencies, rotational directions, or other actuated characteristics are adjusted by actuator 130 to convey a message, such as an encoded message or unique signature.

In the exemplary embodiment depicted in FIG. 8A, actuator marker 124 has arms 126 that extend from the marker 124 and are attached to elements 128. When actuator 130 drives actuator marker 124, arms 126 with elements 128 rotate about a central point of rotation at a frequency and in a direction that is detectable using radar system 14. FIG. 8A shows the marker 124 in a first orientation, and FIG. 8B shows the marker 124 after the elements 128 have been rotated clockwise by an amount. The radar system 14 is configured to recognize element position and changes in position over time, which vehicle controller 20 interprets as a unique signature or encoded message. For instance, frequencies may be sampled over a period of time, such as every half second or tenth of a second. When frequencies change over the sampling period, a message or portion of a message may be provided and interpreted using control logic 54 or entries in a database in memory 52. While arms 126 are depicted in FIG. 8A, actuator marker 124 is contemplated to have different reflector elements in embodiments not depicted, such as blades, spokes, rotors, or other rotatable or moveable elements. As actuator 130 imparts motion, the motion is implemented at specific times in some instances, is constant in some instances, or is periodic over time in other instances. For rotating motion, the frequency is constant in some instances or variable in other instances.

Figure 9A:
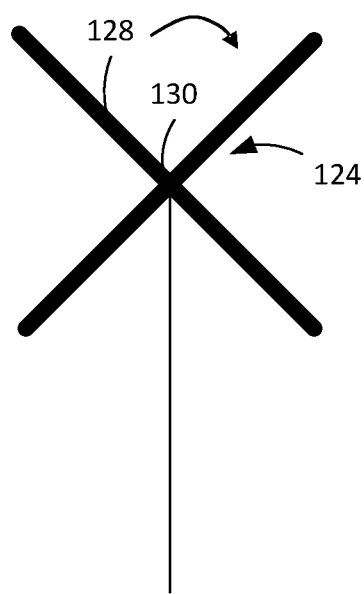
FIG. 9A is a schematic illustration of an exemplary embodiment of radar reflective markers, such as are depicted by FIG. 1, where a characteristic of marker spinning frequency or number of blades conveys unique and unambiguous information to a vehicle.
Figure 9B:
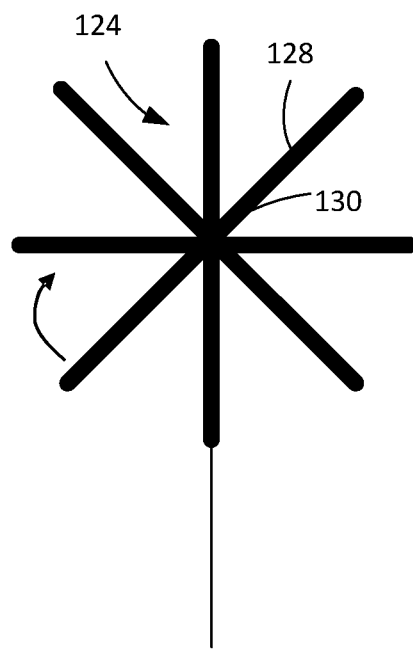
FIG. 9B is a schematic illustration of an exemplary embodiment of radar reflective markers, such as are depicted by FIG. 1, where a characteristic of marker spinning frequency or number of blades conveys unique and unambiguous information to a vehicle. Marker element position has rotated relative the position in FIG. 8A.

In some embodiments, such as the embodiment depicted in FIGS. 9A and 9B, the actuator 130 serves as an actuator marker 124, where characteristics such as the number of elements 128 or speed of rotation convey information to radar system 14. In the example depicted in FIG. 9A, there are four elements 128 on actuator marker 124, while in FIG. 9B there are eight elements 128 on actuator marker 124. The radar controller 17 of the radar system 14 may be configured to count the number of elements 128 on a given marker and use such information as input indicating a parameter of the marker, such as marker type. Also, the radar controller 17 may be configured to determine the speed or rotational frequency of the elements 128 and use such information as input indicating another parameter, such as a data value or other type of information. For example, in FIG. 9A, the four elements 128 may indicate that actuator marker 124 represents a traffic signal, where speed or rotational frequency of actuator marker 124 indicates a red, yellow, or green traffic light. In FIG. 9B, the eight elements 128 may, for example, indicate that actuator marker 124 represents a speed limit, where a speed or rotational frequency of actuator marker 124 indicates a speed limit value.

In some embodiments, the rotational frequency or other movement speed or direction may be modulated to convey an encoded signal. For example, a rotational frequency or speed above a predetermined threshold may be determined to convey a binary "1" value, where a frequency below the predetermined threshold may be determined to convey a binary "0" value. Thus, the frequency or other movement speed may be modulated over time to convey a stream of binary values, which encodes a message, value, or parameter that is interpreted by vehicle controller 20. For example, frequency modulation may be used to convey a binary message of 00 for the color red, 01 for the color yellow, and 10 for the color green at a traffic signal.

In another example, the actuator 130 may encode information using the orientation of one or more elements 128. As an example, a bit or character may be encoded each sampling period by moving the elements 128 to a certain position for the sampling period. For example, the orientation shown by FIG. 8A may represent a binary "0" and the orientation shown by FIG. 8B may represent a binary "1". For a given sampling period for a bit, the actuator 130 may move the elements 128 to the appropriate orientation to convey the desired bit value.

In FIG. 8C, actuator marker 132 has an arm 134 that extends and connects to an element 136. While one arm 134 and element 136 is depicted, more than one arm 134 and element 136 is compatible with the present disclosure. When actuator 130 drives actuator marker 132, arms 134 with elements 136 rotate or move at a velocity or frequency that is detectable using radar system 14. FIG. 8C shows the marker 132 in a first orientation, and FIG. 8D shows the marker 132 after element 136 has been rotated clockwise by an amount. Radar system 14 further detects the position of elements 136 or the change in position of elements 136 over a sampling period. Rotation or motion modulates the position of one or more of rotating elements 136, where the velocity, acceleration, frequency and/or rotating element position provides a unique radar signature that is interpreted by vehicle controller 20. When velocity or frequency is a characteristic that conveys the unique radar signature, it may be done as described for actuator marker 124 in FIG. 8A. When position of elements 136 conveys the unique radar signature, radar system 14 is configured to interpret different rotating element positions, elevations, azimuths, or ranges as corresponding to different unique radar signatures that impart different encoded messages or parameters.

For example, in FIG. 8C, a raised element 136 may indicate one situation, while a lowered element 136 as in FIG. 8D may indicate another situation. This may indicate that when element 136 is raised, road work is ongoing and a lower speed limit is in force, while when element 136 is lowered, no road work is occurring and a higher speed limit is indicated. In another instance, the arm 134 may be utilized to move element 136 at a frequency or frequencies, which may be interpreted as described above for actuator marker 124 in FIG. 8A.

Referring now to FIG. 11, a radar-based information system 11 for localization using localization markers 138, 140, and 142 is depicted. The radar-based information system 11 includes one or more markers 138, 140, and 142, that are positioned such that vehicle 12 with radar system 14 is capable of detecting reflected radio waves and interpreting unique radar signatures for each marker 138, 140, and 142. In the depicted embodiment, three markers 138, 140, and 142 are shown, though more or less markers with different shapes, sizes, reflective elements, positions, spacings, or configurations are contemplated by the present disclosure. The depicted embodiment shows first location marker 138 and second location marker 140 on a side of roadway 22 closest to first road boundary 30, and third location marker 142 closest to second road boundary 32, though other locations and positions of markers not depicted are contemplated by the present disclosure.

When vehicle 12 is proximate markers 138, 140, and 142, radar system 14 receives characteristic information for each marker, which includes a unique radar signature for each marker. The unique radar signature is interpreted by vehicle controller 20 to convey a distinct encoded message for each marker 138, 140, and 142, where the encoded message is, in some instances, an identification and/or geolocation of each marker 138, 140, and 142.

As an example, as noted above, the marker data 53 may store information correlating each marker with its respective location, such as the marker's coordinates (e.g., latitude and longitude) within a predefined coordinate system. Based on the radar returns from the markers 138, 140, and 142, the vehicle controller 20 may be configured to identify each marker 138, 140, and 142 using the techniques described above and then use the marker data 53 to determine each marker's location within the predefined coordinate system. Based on other information gleaned from the returns, such as the range, azimuth, and elevation of each marker 138, 140, and 142 relative to the vehicle 12, the vehicle controller 20 may determine the vehicle's location relative to the locations of the markers 138, 140, and 142. The vehicle controller 20 may then use known algorithms, such as trilateration, triangulation, or multilateration to determine the vehicle's location within the predefined coordinate system, as will be described in more detail below.

In other embodiments, other techniques may be used to determine the vehicle's location. As an example, a given marker 138, 140, and 142 may be configured to convey a message that includes at least one numerical value representing a distance of the marker from a reference point. For example, the value may indicate the marker's distance from a shoulder or a centerline or boundary line of the roadway or lane on which the vehicle 12 is traveling. Using this information as well as the marker's distance from the vehicle 12, the vehicle controller 20 may determine the vehicle's location from the reference point.

In some instances, the encoded message may be an identification and/or geolocation of an object corresponding to each marker 138, 140, and 142. Such an object is, for example, a piece of equipment, a vehicle, a structure, infrastructure, a pipeline, a natural feature, a material, or another identifiable object. As an example, a marker 138, 140, or 142 corresponding a particular object may be positioned in close proximity to such object in order to mark the approximate location of that object. Such marker may convey an identification of or other information corresponding to the object such that, by locating the marker, the location of the object is known or determinable. In some instances, an object identified using markers 138, 140, and/or 142 may be visibly obscured or hidden such that locating the object without use of the corresponding marker may be difficult, (e.g., when the object is covered in snow or located underground). For example, the approximate location of a hidden underground water pipeline may be indicated by a corresponding marker 138, 140, or 142 so that large vehicles, such as mining trucks, avoid damage to the pipeline. In another example, a piece of snow clearing equipment that is left on a side of a roadway may be identified even when obscured with snow so that it may be relocated and retrieved. Locations of markers and nearby objects may be understood by a vehicle controller 20 to be relative to a known coordinate system, such as a global positioning system indicating latitude and longitude.

To better illustrate some of the concepts described above, assume that it is desirable for the markers 138, 140, and 142 to be used to determine the location of the vehicle 12 within a predefined coordinate system. For illustrative purposes, assume that this predefined coordinate system, referred to hereafter as "local coordinate system," is relative to a stationary reference point or origin. Thus, the locations within such local coordinate system of various stationary objects, such as the road, lanes, roadway exits, bridges, etc. may be known. In addition, the locations (e.g., coordinates) of the markers 138, 140, and 142 within this local coordinate system may be known and stored in the marker data 53.

Further assume that the vehicle 12 is traveling at a location where it receives returns from the markers 138, 140, and 142. Based on the returns, the radar system 14 can determine the location of each marker 138, 140, and 142 relative to the radar system 14 and, thus, the vehicle 12. As an example, the radar system 14 can determine the range, azimuth and elevation of each marker 138, 140, and 142 and communicate this information to the vehicle controller 20. In addition, the radar system 14 may also communicate sufficient information about the signatures from the markers 138, 140, and 142 such that the vehicle controller 20 can identify each marker 138, 140, and 142. Using the marker data 53, the vehicle controller 20 can determine the location of each identified marker 138, 140, and 142 within the local coordinate system. In this regard, as described above, the vehicle controller 20 may identify each marker 138, 140, and 142 based on its respective radar signature, which is unique to that marker. After identifying each marker 138, 140, and 142, the vehicle controller 20 may analyze the marker data 53 to determine the coordinates or other location information of each identified marker 138, 140, and 142 within the local coordinate system. Knowing the locations of the markers 138, 140, and 142 within the local coordinate system and the vehicle's location relative to the markers 138, 140, and 142, the vehicle controller 20 may then use trilateration, triangulation, multilateration, or other algorithm to determine the vehicle's location (e.g., coordinates) within the local coordinate system.

For example, in the depicted embodiment, the distance between vehicle 12 and marker 138 is shown as first radius 144, the distance between vehicle 12 and marker 140 is shown as second radius 146, and the distance between vehicle 12 and marker 142 is shown as third radius 148. In this example, multilateration may be used by the vehicle controller 20 to determine the vehicle location 150 within the local coordinate system from radii 144, 146, and 142 and known marker locations within the local coordinate system. In embodiments not shown, angular dimensions detected by radar system 14 of each marker 138, 140, and/or 142 relative to the vehicle 12 may be used with a triangulation approach to determine vehicle location 150. Vehicle location 150, when determined using markers 138, 140, and/or 142 may be more accurate relative to locations determined using GPS. For example, local position or vehicle location 150 may be determined within an accuracy of just a few centimeters according to the disclosed localization system, though other margins are possible in other embodiments. Further, triangulation or multilateration using markers 138, 140, and/or 142 to determine a local position is possible in regions where satellite connectivity is reduced or insufficient for GPS functionality in vehicle 12.

In some embodiments, the vehicle controller 20 may use the vehicle's location within the local coordinate system to make a variety of control decisions and/or to determine or otherwise calculate parameters to be used in control decisions. As an example, by comparing the vehicle's location over time, the vehicle controller 20 may accurately detect the vehicle's instantaneous or average speed or determine the vehicle's position relative to another object such the vehicle's position within the roadway or lane, and proximity to an object or hazard within or near the vehicle's trajectory. In this regard, as noted above, the locations of various stationary objects, such as roads, lanes, exits, and roadside or roadway hazards may be known, and information indicative of such locations may be stored by the vehicle controller 20. As an example, the vehicle controller 20 may store a geographical map indicating the locations of these objects within the map. The vehicle controller 20 may be configured to compare the vehicle's determined location to the locations of the objects in the map to make various control decisions. As an example, the vehicle controller 20 may control the velocity of the vehicle 12 in order to navigate the vehicle 12 along the roadway or to avoid a hazard.

Note that the precision of the vehicle's location within the local coordinate system enables the vehicle controller 20 to make control decisions that may be not possible with less accurate systems, such as GPS. As an example, the vehicle controller 20 may precisely control the vehicle's location within a lane by comparing the vehicle's location to the location of the lane in the stored map. For example, the vehicle controller 20 may control the vehicle 12 such that the center of the vehicle 12 travels along the centerline of the lane or that the tires (or other vehicle component) are a precise distance from an edge of the lane or other reference point. In some embodiments, where the distance or location of a marker 138, 140, and 142 from a road or lane is known, the vehicle controller 20 may precisely position the vehicle 12 within the lane by controlling the vehicle's location from the marker. Various other techniques may be used to control the position of the vehicle 12 in a lane or on a roadway in other embodiments.

As described above, the vehicle controller 20, in some embodiments, initiates responses to information conveyed using radar reflective markers 10 and/or other sensor or vehicle system input. Responses include, for instance, directing vehicle systems to alter speed, vehicle position, or a combination thereof. Other responses include alerting passengers to a condition or parameter conveyed by markers 10. Other responses to information conveyed, at least in part, by markers 10 are contemplated by the present disclosure. In order to respond to such information, vehicle controller 20 is configured to communicate with system controllers 21 or other controllers not depicted in FIG. 2. Communication with system controllers 21 is, in some instance, direction to alter vehicle components, systems, or operation in response to information conveyed, at least in part, by markers 10.

For example, when the vehicle location 150 is determined by vehicle controller 20 from markers 138, 140, and/or 142, the local position may be determined with such precision that position within lane 24, position relative to road or lane boundary 30, 32, or position relative to centerline 28 is known. The vehicle controller 20 may be configured to identify when vehicle 12 is or is not in a desirable local position, and adjust vehicle position within lane 24 relative to road or lane boundary 30, 32 or to centerline 28 when a change to the local position is desired. As an example, in instances where markers 10 convey a message regarding a hazard or object impeding a vehicle's intended path, the vehicle controller 20 may be configured to direct vehicle 12 into another lane, when available, or to slow or stop vehicle 12 prior to impact with the hazard or object.

In some instances, the local positions of vehicles 12 within a lane may be controlled such that wear on the roadway is better distributed across the surface of the lane 24. In this regard, if a large number of autonomous vehicles are controlled to drive precisely along the centerline of a lane (e.g., where the center of the vehicle 12 travels substantially along the centerline), then it is likely that the tires of the vehicles will make contact with the lane in substantially the same regions. This is in contrast to human drivers that may be more susceptible to veering and thus vary the relative positioning of vehicles within a lane in a more random fashion. In addition, the wear of a roadway may be particularly problematic along certain roads that carry a relatively large number of heavy vehicles, such as dump trucks, 18-wheelers, or other vehicles that typically carry heavy cargo.

To help distribute wear across a surface of a lane more evenly, the vehicle controllers 20 of different vehicles may control the vehicles 12 such that each vehicle 12 travels at a slightly different position or offset from the lane centerline relative to other vehicles. There are various techniques that can be used to achieve this effect. In some embodiments, each vehicle 12 is assigned an offset value indicating amount of offset from a reference point, such as a lane boundary or centerline, that the vehicle 12 is travel down a lane 24. The offset values may be randomly assigned within a certain range so that the offset value of each vehicle 12 is likely different than most if not all of the other vehicles 12, but other techniques for determining the offset values are possible.

After the vehicle controller 20 receives the offset value assigned to its vehicle 12, the vehicle controller 20 controls operation of the vehicle 12 so that it travels down a lane at the offset assigned to it. In controlling the position of the vehicle 12 within the lane 24, the vehicle controller 20 may determine the vehicle's local position based on radar reflections from the markers described above, or some other techniques for determining the vehicle's location may be used (e.g., using a camera that images a lane so that the vehicle's position within the lane may be determined by identifying road markings or boundaries in the captured images).

In some embodiments, the offset values are algorithmically determined based on various factors, such as vehicle type, size, or weight. In this regard, the offset values assigned to the vehicles 12 may be controlled by a central or remote server (not shown) in communication with the vehicle controllers 24. Each vehicle controller 24 may be configured to submit a request for an offset value for a lane 24 as the vehicle 12 is traveling down the lane 24 or before entering the lane 24. Such request may include information about the vehicle 12, such as it type, size, or weight. In response to receiving such request, the remote server may be configured to use the vehicle information in the request, such as type, size, or weight, to determine an offset value for the vehicle 12 and return such offset value to the vehicle controller 20 for use in controlling the position of the vehicle 12 within the lane 24, as described above. As an example, the remote server may consider the offsets assigned to other vehicles of a similar type, size, or weight and select an offset value for the current vehicle 12 that is significantly different than the offset values or the average of the offset values for the other vehicles of a similar type, size, or weight. Various other techniques for selecting a desired offset value are possible.

An embodiment of a spinning actuator marker 212 is depicted in FIG. 12, where a traffic light assembly 210 encases or otherwise supports actuator marker 212. The frequency or speed of rotation of the marker 212 conveys a unique radar signature that corresponds to the signal conveyed by the traffic light assembly 210. For instance, one frequency may indicate that the traffic light assembly 210 is conveying a red (stop) signal, another frequency may indicate that the traffic light assembly 210 is conveying a green (go) signal, and another frequency may indicate that the traffic light assembly 210 is conveying a yellow signal, as described for FIG. 8A. However, other messages are capable of being conveyed by the marker 212. For instance, the frequency of the marker 212 may be configured to convey a message alerting a vehicle 12 to an impending change in the traffic signal, such as from red-to-green, yellow-to-red, or green-to-yellow, and thus permit vehicle controller 20 to adjust vehicle speed or operation accordingly.

As an example, knowing that the traffic light assembly 210 is about to transition from green-to-yellow, the vehicle controller 20 of an approaching vehicle 12 may begin to slow sooner than it otherwise would relative to an embodiment in which it was only able to discern the current state of the traffic light assembly 210. This may help to improve safety or conserve fuel. In some embodiments, the frequency of the marker 212 may convey a value indicative of the time that the traffic light assembly 210 will transition to the next state. For example, the marker 212 may convey a countdown where the value conveyed is decreased to mark the current time remaining until the change of state, such as a transition from green-to-yellow, yellow-to-red, or red-to-green. Thus, the frequency of rotation may be continuously or repetitively changed to indicate such time remaining. In other embodiments, other techniques are possible for indicating the amount of time remaining or that a transition of a state of the traffic light assembly 210 is imminent. For example, the positional orientation of a marker may be used to indicate the state of the traffic light assembly 210, according to the techniques described above for FIGS. 8A and 8B.

Note that the location of marker 212 is shown in a top portion of the traffic light assembly 210 in the depicted example, such as at the location of or coupled to a red light of the assembly 210 though other locations are contemplated. As an example, a respective marker 212 may be located on or coupled to each light of the assembly. In such an example, the corresponding marker 212 at or coupled to a light currently emitting a light signal may be activated (e.g., spinning) while the other markers are deactivated (e.g., not spinning) to indicate which lights are currently emitting signals. In another embodiment, the light(s) currently emitting a signal may be spinning at one frequency or rate while the light(s) that for which emission of a signal is eminent may be spinning at another frequency or rate to indicate the impending transition of the state of the assembly 210. In some instances, a marker 212 may be located proximate, but not connected to, the traffic light assembly 210.

Referring now to FIG. 13, an embedded radar reflective marker 312 is shown attached to or embedded within a lane reflector 310. Such a lane reflector 310 may be positioned on a roadway to indicate a boundary or other aspect of the roadway. As an example, reflectors 310 may be positioned along a lane line (e.g., centerline 314 of a roadway) that is used to mark a boundary of the lane. The reflector 310 is composed of a material that reflects light from the headlights of vehicles so that drivers can better visualize the boundary or other reference marked by the reflector 310 at night or during reduced visibility.

The marker 312 is positioned to provide radar-detectable information about the location of centerline 314 or other lane or road boundaries. That is, by reflecting radar signals, the marker 312 and, thus, reflector 310 is visible to the radar system 14 such that the vehicle controller 20 can use the radar information from the radar system 14 to determine the location of the boundary marked by the marker 312 and reflector 310. Such information may be particularly helpful when road conditions make visual detection of boundaries difficult or impossible, such as when roads are covered in snow or in low light conditions.

Referring now to FIG. 14, an exemplary lane positioning system 400 is depicted. Lane positioning system 400 includes at least one sensor-identifiable marker 410, which may be a radar reflective marker, a visually identifiable marker, or any other marker identifiable as such by a sensor system 414 on a vehicle 412. Sensor-identifiable marker 410 may be located proximate lane 420 of a roadway, or may be embedded within or comprise at least a portion of a roadway feature, such as a lane boundary 416 or centerline 418. Marker 410 is configured to provide information regarding road boundary locations, lane boundary locations, marker geolocations, lane boundary geolocations, road features, road trajectory, traffic conditions, traffic signals, speed limits, and/or other roadway or vehicle information either directly or indirectly. Further, marker 410 may provide an indication of upcoming or changing roadway, traffic, or vehicle information.

When marker 410 is a radar reflective marker, it is configured to convey a unique radar signature, as described above. The unique radar signature may provide an encoded message or correspond to an entry in a database, as described above. The unique radar signature may indicate a lane boundary, a lane boundary location, or a geolocation corresponding to a lane boundary in some instances. In some embodiments, a lane position of vehicle 412 is at least partially determined from at least one of a range, azimuth, and elevation of vehicle 412 with respect to marker 410.

When marker 410 is a visually identifiable marker, it is configured to be detectable by sensor system 414 on vehicle 412, such as a camera. For example, a camera may perform a uniform scan to range and detect objects in proximity to vehicle 412. The sensing may be undertaken using one or more cameras that interpret environmental details visually, and with optional assistance from other sensing systems, as described above. In some instances, marker 410 is identifiable via either radar system 14 or a visual sensor. In some instances, one or more markers 410 or lane boundaries are identifiable via either radar system 14, while other markers 410 or lane boundaries are identifiable via visual sensing systems. In some instances where environmental conditions influence visibility, vehicle controller 20 determines an appropriate sensor system 414 to detect markers 410 or lane boundaries. For example, in snow conditions, vehicle controller 20 may select radar system 14 for detecting markers 410 or lane boundaries. In other instances where environmental conditions influence visibility, vehicle controller 20 receives information from more than one sensor system 414 to detect markers 410 or lane boundaries. For example, in low light conditions, lane boundaries may be detected both visually using cameras and through markers 410 identified using radar system 14.

When multiple sensor systems 414 are available for detecting markers 410 or lane boundaries, vehicle controller 20 is configured to determine a confidence value corresponding to the accuracy of information received using each sensor system 414. For example, a confidence value may be determined based on the quality of images or image data received from a camera relative to a predetermined quality threshold. A confidence value greater than or equal to a quality threshold may be considered adequate, and may indicate that the sensor system 414 providing the confidence value is capable of detecting markers 410 or lane boundaries in the current environmental conditions. In this case, vehicle controller 20 may instruct the camera to detect markers 410 or lane boundaries. A confidence value less than a quality threshold may be considered inadequate, and may indicate that the sensor system 414 providing the confidence value is not capable of detecting markers 410 or lane boundaries with sufficient accuracy in the current environmental conditions. In this case, vehicle controller 20 may use an alternative sensor system, such as radar system 14, to detect markers 410 or lane boundaries.

Alternatively, in the case when the confidence value is less than a quality threshold, vehicle controller 20 may instruct both the camera and radar system 14 to detect markers 410 or lane boundaries and compare camera data with radar data for verification. When there are discrepancies between the data, vehicle controller 20 may rely on data from radar system 14. For example, when low light conditions occur and a confidence value of camera image data is less than a quality threshold, both camera and radar system 14 may be used with a reliance on radar system data when discrepancies between radar and camera data exist. In yet other embodiments, the vehicle controller 20 may resolve discrepancies between sensing systems in other ways.

In some instances, marker 410 is lane boundary 416 or is embedded within lane boundary 416, such as shown in the system depicted in FIG. 13. Lane boundary 416 of FIG. 14 is identifiable using a sensor system 414, such as a camera. Vehicle controller 20 is configured to determine, from data provided by sensor system 414, the position of lane boundary 416 and to use this information to adjust vehicle 412 via system controllers 21, as described above. Similar to lane boundary 416, centerline 418 is identifiable using sensor system 414 and may be used to provide information to adjust vehicle 412.

Upon determining the location of lane boundary 416, centerline 416, or other roadway boundaries provided by marker 410, vehicle controller 20 is configured to determine a vehicle lane position. When sensor system 414 is a visual sensing system, image data is provided to vehicle controller 20 to identify the location of lane boundary 416, centerline 416, or other roadway boundaries provided by marker 410. Vehicle controller 20 then uses this data to determine the lane position of vehicle 412. When sensor system 414 is radar system 14, radio waves are received by radar receiver 18 of radar system 14 following their reflection from at least one radar reflective marker located proximate vehicle 412. These received radio waves are configured to convey unique radar signatures, and each unique radar signature may correspond to a respective radar reflective marker. The unique radar signatures, along with at least one of range, azimuth, and elevation dimensions of vehicle 412 with respect to marker 410, are communicated to vehicle controller 20. Vehicle controller 20 determines the lane position of vehicle 412 from the unique radar signature and at least one of the range, azimuth, and elevation dimensions. As an example, the distance of marker 410 from a lane boundary may be predefined and known by the vehicle controller 20 or such distance may be communicated by the marker 410 (according to techniques described above) so that the vehicle controller 20 is aware of the distance. Thus, based on the determined location of the marker 410 relative to the vehicle, the vehicle controller 20 (using the known distance between the marker 410 and the lane boundary) can determine the location of the lane boundary relative to the vehicle and, thus, the lane position of the vehicle within the lane marked by the lane boundary.

When vehicle lane position is determined, vehicle controller may establish an initial trajectory 422 in which vehicle 412 is configured to follow when no adjustments are made to vehicle operation. Initial trajectory 422 is adjusted when vehicle controller 20 instructs vehicle system controllers 21 to alter vehicle operation. For instance, vehicle controller 20 may instruct vehicle movement to a new lane position to the right of the initial lane position by adjusting initial trajectory 422 to right-shifting trajectory 426 in FIG. 14. Similarly, vehicle controller 20 instructs vehicle movement to a new lane position to the left of the initial lane position by adjusting initial trajectory 422 to left-shifting trajectory 424. Any adjustments to vehicle initial trajectory 422 may be made in response to the current lane position determined using sensor system 414, due to other road or traffic conditions, or due to a combination thereof, as is discussed in detail below.

When lane position is to be adjusted, vehicle controller 20 may determine a new lane position that is a safe lane position (e.g., within a predefined range of lane positions deemed to be safe for normal operation). Data indicative of such range may be stored in memory 52 or another memory location. Marker 410 may include an encoded message that provides a pointer to an entry or entries indicating safe lane positions, or the message can provide lane information such as lane location, lane width, a number of proximate lanes, a direction of traffic in the lane or proximate lanes, or other information used to determine a safe lane position for vehicle 412.

In some cases, when lane position is to be adjusted, vehicle controller 20 may determine a new lane position that is within a certain range of lane boundary 416. The new position may be selected using a deterministic algorithm stored in memory 52 and executed by processor 50. The deterministic algorithm may select a random position within a predetermined range from lane boundary 416 by use of a random number generator or other randomizing means. Alternatively, the deterministic algorithm may select a specific position within a predetermined range from lane boundary 416 based on input from sensor system 414 regarding current lane position of vehicle 412, roadway conditions, traffic conditions, and anticipated roadway and traffic conditions.

In some embodiments, lane position is determined using at least one server that may be located remotely from the vehicle 412. Server 440 communicates with vehicle controller or controllers 20 as shown in FIG. 15. Server 440 may be implemented in hardware or a combination of hardware with software and/or firmware. As an example, server 440 may comprise one or more field programmable gate arrays (FPGAs) or application-specific integrated circuits (ASICs). In some embodiments, server 440 has software that is executed by one or more processors 450 of server 440, as depicted in FIG. 16.

Further, in FIG. 16, control logic 454 is implemented in software and stored in memory 452 of server 440. However, other configurations of the control logic 454 are possible in other embodiments. The control logic 454 may be configured to process data from one or more vehicle controllers 20, calculate or determine values or parameters from the data, store information in memory 452, and process lane position information, as will be described in more detail below.

As shown by an embodiment in FIG. 16, the server 440 may have at least one processor 450 configured to communicate with and drive other elements within server 440 via at least one bus. As an example, the processor 450 may be a digital signal processor (DSP), central processing unit (CPU), or any instruction execution apparatus that is configured to retrieve and execute instructions from memory 452. As an example, when the control logic 454 is implemented in software, the processor 450 may be configured to retrieve and execute instructions from the control logic 454 to perform the functions ascribed herein to server 440. For instance, when lane position or marker location data from a vehicle or group of vehicles 412 is communicated to server controller 440, control logic 454 may be implemented to identify a new lane position or offset from a lane boundary 416, as is described below in detail.

In FIG. 16, a network interface 456 is provided to receive inputs from and convey outputs to vehicle controller(s) 20 of vehicle(s) 412. For instance, network interface 456 may be a radio, a modem, or any other device or system configured to enable communication between a vehicle controller 20 and server 440. As an example network interface 456 may be communicatively coupled (wired or wirelessly) to vehicle controller 20, as shown in FIG. 15 via network 442, thereby enabling server 440 to communicate with any of these vehicles 412 or vehicle controllers 20.

Referring now to FIG. 17, vehicle 412 may have lane position adjusted due to input from sensor system 414 related to both road and traffic conditions. In some instances, such as those depicted in FIG. 17, marker 410 provides road or traffic information to sensor system 414 that results in vehicle controller 20 adjusting a vehicle lane position. In addition, the location, position, or direction of nearby vehicles 413 can at least partially determine a lane position of vehicle 412. For instance, vehicle controller 20 of vehicle 412 may utilize information from marker 410 to determine a central lane position trajectory 425 in which vehicle 412 is positioned when no other impacting circumstances are detected. However, upon detecting nearby traffic, such as vehicle 413 in opposing traffic lane 421, sensor system 414 provides this information to vehicle controller 20, which instructs system controllers 21 to adjust vehicle lane position to a second trajectory 426 that positions vehicle 412 further from the oncoming vehicle 413. In some instances, the location or direction of another vehicle 413 differs from that depicted in FIG. 17 and still results in lane position adjustment of vehicle 412. In some instances, sensor system 414 detects an object other than a vehicle and system controllers 21 are instructed to adjust vehicle lane position to a second trajectory 426 that positions vehicle 412 further from the object. Exemplary objects include roadside equipment, signs, pedestrians, bikers, downed power lines, storm debris, wildlife, and fallen trees or branches or other objects that may be encountered by a traveling vehicle.

In FIG. 18, lane positioning of vehicle 412 is shown in response to an approaching road feature or roadway condition, such as an intersection. Other exemplary road features or conditions include a traffic circle, a traffic signal, a traffic sign, a curve in the road, a turn in the road, a splitting of lanes, a merging of lanes, an addition of lanes, a reduction of lanes, an exit, an entrance, a narrowing of the road or lane, a widening of the road or lane, a bridge, a tunnel, an overpass, an underpass, a toll booth, a crosswalk, a bike lane, a traffic barrier, or any other road or traffic path or feature that potentially impacts an optimal vehicle path or position. Marker 410 provides road or traffic information regarding road features or approaching road features to sensor system 414 that results in vehicle controller 20 adjusting a vehicle lane position.

For instance, vehicle controller 20 of vehicle 412 may utilize information from markers or lane boundaries to determine an initial trajectory 422 in which vehicle 412 is positioned when no other impacting circumstances are detected. At Point 1 of FIG. 18, sensor system 414 detects marker 410, which provides information regarding an upcoming road feature, such as an intersection. This information is communicated to vehicle controller 20, which determines a second trajectory 426 in which vehicle 412 is to be placed in anticipation of a maneuver related to the road feature. In the depicted embodiment, vehicle 412 is shifted to second trajectory 426 in anticipation of an upcoming turn at Point 2 of FIG. 18. Specifically, the vehicle 412 is moved slightly left to a different lane position that is closer to the lane boundary 416 in anticipation of the upcoming turn so that the radius of curvature in making the turn at the intersection can be less relative to the radius of curvature if the vehicle attempts to initiate the turn while in the original lane position corresponding to trajectory 422. In the second trajectory 426, vehicle is better prepared or more safely positioned to make a maneuver associated with the anticipated road feature. In the depicted example, the vehicle's placement on second trajectory 426 at Point 2 allows vehicle 412 to exit a turn at a different lane position at Point 3 than it would otherwise have if it remained on initial trajectory 422.

Referring back to FIG. 14, another embodiment of lane positioning allows the distribution of roadway wear by altering the lane positions of a plurality of vehicles 412 traversing the roadway. As described above, vehicles 412 detect road or lane boundaries 416 through visual sensing, radar detection, or other sensing means using sensor system 414. In some embodiments, sensor system 414 detects markers 410 that provide information allowing vehicle controller 20 to identify the position of road or lane boundaries 416. A lane position for each vehicle of the plurality of vehicles may be either randomly assigned or specifically assigned to distribute vehicle lane positions more evenly among a range of vehicle lane positions so that wear on the roadway is more evenly distributed, as will be described in more detail hereafter.

When a radar system 14 is utilized, each vehicle 412 of the plurality of vehicles is equipped with radar system 14 and vehicle controller 20. Radio waves reflected from markers 410 are received by radar system 14 and their unique radar signatures are communicated to vehicle controller 20, as described above. Control logic 54 is implemented in software and stored in memory 52 of each vehicle controller 20, as described above. Control logic 54 is configured to determine a lane position of vehicle 412 from the unique radar signature and to provide instructions for vehicle controller 20 to adjust the vehicle lane position to reduce roadway wear. In some instances, the unique radar signature directly provides a lane boundary location, while in other instances it provides a pointer to a database entry that corresponds with the geolocation of the lane boundary.

Control logic 54 is additionally configured to access stored data indicating safe lane positions for vehicles to occupy. The safe lane positions may be relative to the locations of lane boundaries 416, 417 or centerline 418 and the data may indicate a plurality of potential lane positions (e.g., a range of lane positions) in which vehicle 412 may be placed. Safe lane positions may further be determined using other information provided by sensor system 414 or radar system 14, including the location of roadside objects, nearby vehicles, or road features. A safe lane position may be a lane position in which vehicle 412 is sufficiently separated from nearby objects or boundaries, sufficiently within lane 420, and sufficiently positioned to make future traffic maneuvers.

In some instances, control logic 54 of vehicle controller 20 is configured to communicate with a server 440, such as depicted in FIG. 15, via network 442 or otherwise. The transfer of data or signals between vehicle controller 20 and network 442 is bidirectional, as is the transfer of data or signals between network 442 and server 440. The communication allows vehicles 412 to communicate their current location and/or lane position to server 440, while server 440 provides new lane positions or the instruction not to change a lane position to vehicles 412, as is described in detail below.

In some instances, such is in FIG. 14, control logic 54 provides instructions for vehicle lane position adjustment by randomly assigning vehicle 412 a safe lane position from the range of safe lane positions, which may be indicated by predefined data stored in memory. In such instances, the randomization of lane positions allows the plurality of vehicles to be distributed in a variety of lane positions about lane 420, which reduces roadway wear within lane 420. In some instances, control logic 54 provides instructions for vehicle lane position adjustment by assigning vehicle 412 a predetermined safe lane position from a range of safe lane positions.

In some instances, control logic 54 provides instructions for vehicle lane position adjustment by randomly assigning vehicle 412 a lane position that is within a predetermined distance or range from lane boundary 416. In such instances, the randomization of lane positions allows the plurality of vehicles to be distributed in a variety of lane positions about lane 420, which reduces roadway wear within lane 420. In some instances, control logic 54 provides instructions for vehicle lane position adjustment by assigning vehicle 412 a predetermined a lane position that is within a predetermined distance or range from lane boundary 416.

Vehicle controller 20 is configured to transmit the current lane position of vehicle 412 to other vehicles 413 that are on the roadway or within a predetermined distance of vehicle 412 to server 440. Similarly, vehicle controller 20 is configured to receive current lane positions of vehicles 413 that are on the roadway or within a predetermined distance of vehicle 412 from server 440. Using this information, control logic 54 of vehicle controller 20 is configured to determine lane positions in which vehicle 412 may occupy. For instance, control logic 54 may be configured to access stored data indicative of safe lane positions or configured to determine available lane positions within a predetermined range of lane boundary 416. Furthermore, control logic 54 is configured to provide instructions for vehicle lane position adjustment by assigning vehicle 412 to a safe lane position within a range of safe lane positions or to an available lane position within the predetermined range of lane boundary 416.

In some instances, control logic 54 is configured to select a safe lane position or available lane position at least partially based on current lane positions of other vehicles 413. In such instances, lane positions of vehicles may be randomized or assigned by a deterministic algorithm such that the lane positions of a plurality of vehicles traveling along a roadway are varied, thereby more evenly distributing wear on the roadway across the lane. When lane positions are randomized, available lane positions or safe lane positions may be selected using a random number generator or other randomizing algorithm, such that the occurrence of any vehicle 412 occupying a specific lane position is random at least within a range of safe lane positions. The distribution of lane positions of vehicles allows wear to be distributed randomly about lane 420. The reduction in wear may result in less frequent roadway upkeep and a reduction in costs of roadway upkeep. When lane positions are assigned by a deterministic algorithm, they are selected from a range of lane positions that fall within a predetermined range of lane boundary 416. For example, a first vehicle may be assigned a lane position closest to lane boundary 416, while a second vehicle is assigned a lane position that is one position to the left of the position of the first vehicle. This process may be repeated for vehicles until a vehicle is assigned a lane position farthest from lane boundary 416, at which point the assignment cycles back to the position closest to lane boundary 416. In such a manner, vehicles are distributed in lane position about lane 420.

Alternatively, when lane positions are assigned by a deterministic algorithm, they may be selected such that the selected lane positions vary from vehicle-to-vehicle such that each vehicle of a plurality of vehicles traveling along the lane are slightly offset from one another within a range of safe lane positions.

In some instances, such is in FIG. 15, server 440 provides instructions for vehicle lane position adjustment. As shown in FIG. 16, control logic 454 of server 440 may provide instructions for vehicle lane position adjustment by randomly assigning vehicle 412 a lane position from a range of safe lane positions indicated by data stored in memory 452. In such instances, the randomization of lane positions allows the plurality of vehicles to be distributed in a variety of lane positions about lane 420, which reduces roadway wear within lane 420. In some instances, control logic 454 provides instructions for vehicle lane position adjustment by assigning vehicle 412 a random lane position within a range of safe lane positions or by using a deterministic algorithm to compute a new safe lane position.

In some instances, control logic 454 provides instructions for vehicle lane position adjustment by randomly assigning vehicle 412 a lane position that is within a predetermined distance or range from lane boundary 416. In such instances, the randomization of lane positions allows the plurality of vehicles on the roadway to be distributed in a variety of lane positions about lane 420, which reduces roadway wear within lane 420. In some instances, control logic 454 provides instructions for vehicle lane position adjustment by assigning vehicle 412 a predetermined a lane position that is within a predetermined distance or range from lane boundary 416.

Vehicle controller 20 may be configured to transmit the current lane position or location of vehicle 412 to server 440, which also receives current lane positions or locations of other vehicles 413 that are on the roadway or within a predetermined distance of vehicle 412. Using this information, control logic 454 of server 440 may be configured to determine lane positions in which vehicle 412 are to occupy. For instance, control logic 454 may be configured to access safe lane positions stored in memory or otherwise configured to determine available lane positions within a predetermined range of lane boundary 416. Furthermore, control logic 454 is configured to provide instructions for vehicle lane position adjustment by assigning vehicle 412 to a safe lane position from a predefined range of safe lane positions or to an available lane position within the predetermined range of lane boundary 416. In some instances, control logic 454 is configured to select a safe lane position or available lane position at least partially based on current lane positions of other vehicles 413.

To better illustrate the foregoing, refer to FIG. 19, which shows an exemplary roadway having a lane 24 along which multiple vehicles 12 travel. In FIG. 19, the lane 24 is defined by a road boundary 30 and a centerline 28, which server as lane boundaries for the lane 24. However, other types of lane boundaries are possible such as a lane line that extends near the road boundary 30.

In FIG. 19, reference lines 511, 512 represent a range of safe lane positions for the vehicles 12. In this example, a safe lane position for a vehicle 12 refers to a position of the vehicle 12 between the lane boundaries such that a predefined reference point of the vehicle (e.g., a center of the vehicle or a tire of the vehicle or an edge of the vehicle or tire), referred to hereafter as "Reference Point," is between the reference lines 510, 511 as the vehicle 12 travels along the lane 24. In one embodiment, the vehicle controller 20 of each vehicle 12 is configured to assign a randomized lane position within the safe lane positions such that the Reference Points of the vehicles 12 are likely offset as the vehicles 12 travel along the lane 24. As an example, the Reference Point of one vehicle 12 may travel along a path represented by reference arrow 521, the Reference Point of another vehicle 12 may travel along a path represented by reference arrow 522, and the Reference Point of yet another vehicle 12 may travel along a path represented by reference arrow 523, noting that each reference arrow 521-523 is at a different offset within the lane 24. As a result, the tires of each vehicle 21 are likely offset such that the paths for the tires of the vehicles do not completely overlap. That is, the tire paths are likely at different offsets from the road boundary 30 (or other reference point associated with the lane) such that wear on the roadway by the vehicles 12 is better distributed across the lane 24. Thus, the useful life of the roadway may be extended before significant repairs are needed. As noted above, the lane positions may be selected by a remote server 440 and assigned to the vehicle controllers 20 by the server 440 rather than allowing the vehicle controllers 20 to independently select lane positions. Further, the selection may be deterministic rather than random.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention, which is set forth in the following claims.

Now, therefore, the following is claimed:

1. A system for vehicle lane position adjustment comprising:
   a radar system positioned on a first vehicle, the radar system having a transmitter and a receiver, wherein the transmitter is configured to transmit radio waves and the receiver is configured to receive reflections of the radio waves, and wherein the radar system is configured to provide radar data indicative of the reflections; and
   at least one controller positioned on the first vehicle, the at least one controller configured to
      identify, based on the radar data, at least one radar marker positioned along a roadway, wherein each of the at least one marker is encoded with an identifier for identifying the at least one marker based on at least one physical characteristic thereof,
      wherein for one or more of the at least one marker, the at least one physical characteristic thereof comprises an actuated element which is dynamically adjustable by an actuator to convey an encoded identifier, decode the identifier based on the radar data and determine at least one location of the identified at least one radar marker, and control a lane position of the first vehicle within a lane of the roadway based on the at least one location.

2. The system for vehicle lane position adjustment of claim 1, wherein the at least one controller is configured to control the lane position of the first vehicle within the lane based on the determined at least one location such that the first vehicle is a predetermined distance from a reference point or line associated with the lane.

3. The system for vehicle lane position adjustment of claim 2, wherein the reference point or line is along a lane boundary of the lane.

4. The system for vehicle lane position adjustment of claim 1, wherein the at least one marker is encoded with information indicative of a condition associated with the roadway, and wherein the at least one controller is configured to decode the information based on the radar data and to adjust the lane position of the first vehicle within the lane of the roadway based on the information.

5. The system for vehicle lane position adjustment of claim 4, wherein the condition is an upcoming traffic signal or an upcoming traffic intersection.

6. The system for vehicle lane position adjustment of claim 1, wherein at least one location of the identified radar marker is at least partially determined from at least one of a range, azimuth, and elevation of the radar marker.

7. The system for vehicle lane position adjustment of claim 1, wherein the at least one controller is configured to control the lane position of the first vehicle within the lane of the roadway based on the at least one location and a position of at least one other vehicle proximate the first vehicle.

8. The system for vehicle lane position adjustment of claim 7, wherein the at least one other vehicle is in the same lane as the first vehicle.

9. The system for vehicle lane position adjustment of claim 7, wherein the at least one other vehicle is in a lane adjacent to the lane of the first vehicle.

10. A method of adjusting vehicle lane position comprising:

receiving radar data from a radar system positioned on a first vehicle, the radar system having a transmitter and a receiver, wherein the transmitter transmits radio waves and the receiver receives reflections of the radio waves from at least one radar marker positioned along a roadway, and wherein the radar data is indicative of the reflections;

identifying, based on the radar data, each of the at least one radar marker positioned along a roadway at least in part by decoding respective encoded identifiers of the at least one radar marker based on at least one physical characteristic thereof;

wherein for one or more of the at least one marker, the at least one physical characteristic thereof comprises an actuated element which is dynamically adjustable by an actuator to convey an encoded identifier;

determining at least one location of the identified at least one radar marker; and controlling a lane position of the first vehicle within a lane of the roadway based on the at least one location.

11. The method of claim 10, wherein the lane position controlling is based on the determined at least one location such that the first vehicle is positioned a predetermined distance from a reference point or line associated with the lane.

12. The method of claim 11, wherein the reference point or line is along a lane boundary of the lane.

13. The method of claim 10, further comprising:

decoding, based on the radar data, encoded information of the at least one radar marker; and controlling the lane position of the first vehicle within the lane of the roadway based on the information, wherein the information is indicative of a condition associated with the roadway.

14. The method of claim 13, wherein the condition is an upcoming traffic signal or an upcoming traffic intersection.

15. The method of claim 10, wherein the determining includes detecting at least one of a range, azimuth, and elevation of the radar marker.

16. The method of claim 10, wherein the controlling is based on the at least one location and a position of at least one other vehicle proximate the first vehicle.

17. The method of claim 16, wherein the at least one other vehicle is in the same lane as the first vehicle.

18. The method of claim 16, wherein the at least one other vehicle is in a lane adjacent to the lane of the first vehicle.

\* \* \* \* \*